(12) United States Patent
Das Sharma

(10) Patent No.: US 11,595,318 B2
(45) Date of Patent: Feb. 28, 2023

(54) ORDERED SETS FOR HIGH-SPEED INTERCONNECTS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/397,710

(22) Filed: Aug. 9, 2021

(65) Prior Publication Data

US 2021/0367900 A1    Nov. 25, 2021

Related U.S. Application Data

(63) Continuation of application No. 16/723,868, filed on Dec. 20, 2019, now Pat. No. 11,296,994.

(Continued)

(51) Int. Cl.
*H04L 47/34* (2022.01)
*H04L 12/12* (2006.01)
*H04L 1/20* (2006.01)

(52) U.S. Cl.
CPC ............ *H04L 47/34* (2013.01); *H04L 1/203* (2013.01); *H04L 12/12* (2013.01)

(58) Field of Classification Search
CPC ......... H04L 47/34; H04L 1/203; H04L 12/12; G06F 13/4282; G06F 2213/0026; G06F 13/124

See application file for complete search history.

(56) References Cited

U.S. PATENT DOCUMENTS 6,400,728 B1    6/2002   Ott
6,411,654 B1    6/2002   Furutani et al.
(Continued)

FOREIGN PATENT DOCUMENTS

EP    1253729 A2    10/2002
EP    2634983 A2    9/2013
(Continued)

OTHER PUBLICATIONS

EPO; Extended European Search Report issued in EP Patent Application No. 20217123.7, dated Oct. 6, 2021; 13 pages.
(Continued)

*Primary Examiner* — Chandrahas B Patel
(74) *Attorney, Agent, or Firm* — Alliance IP, LLC

(57) ABSTRACT

A system and apparatus can include a port for transmitting data; and a link coupled to the port. The port can include a physical layer device (PHY) to decode a physical layer packet, the physical layer packet received across the link. The physical layer packet can include a first bit sequence corresponding to a first ordered set, and a second bit sequence corresponding to a second ordered set, the first bit sequence immediately adjacent to the second bit sequence. The first ordered set is received at a predetermined ordered set interval, which can occur following a flow control unit (flit). The first ordered set comprises eight bytes and the second ordered set comprises eight bytes. In embodiments, bit errors in the ordered sets can be determined by checking bits received against expected bits for the ordered set interval.

34 Claims, 21 Drawing Sheets

Related U.S. Application Data

(60) Provisional application No. 62/846,913, filed on May 13, 2019.

(56) References Cited

U.S. PATENT DOCUMENTS

| | | | |
|---|---|---|---|
| 7,124,333 B2 | 10/2006 | Fukushima et al. | |
| 7,127,653 B1 | 10/2006 | Gorshe | |
| 7,958,431 B2 | 6/2011 | Hollums | |
| 7,995,696 B1 | 8/2011 | Norrie | |
| 8,400,728 B2 | 3/2013 | Thompson et al. | |
| 8,417,847 B2 | 4/2013 | McNutt et al. | |
| 8,446,921 B2 * | 5/2013 | Chen | H04L 12/40013 370/545 |
| 8,824,581 B2 * | 9/2014 | Okada | H03M 9/00 370/464 |
| 9,311,268 B1 | 4/2016 | Chen et al. | |
| 9,396,152 B2 * | 7/2016 | Pethe | G06F 13/4282 |
| 10,114,790 B2 * | 10/2018 | Hanchinal | G06F 13/4022 |
| 10,210,040 B2 | 2/2019 | Circello et al. | |
| 10,250,436 B2 | 4/2019 | Sharma | |
| 10,372,647 B2 | 8/2019 | Lovett et al. | |
| 10,771,189 B2 | 9/2020 | Sharma | |
| 10,784,986 B2 | 9/2020 | Sharma | |
| 2003/0110422 A1 | 6/2003 | Naffziger et al. | |
| 2003/0198252 A1 | 10/2003 | Thrysoe | |
| 2004/0264960 A1 | 12/2004 | Maciocco et al. | |
| 2005/0063701 A1 | 3/2005 | Ovadia et al. | |
| 2005/0160346 A1 | 7/2005 | Yamane | |
| 2005/0172091 A1 | 8/2005 | Rotithor et al. | |
| 2005/0193312 A1 | 9/2005 | Smith et al. | |
| 2006/0123328 A1 | 6/2006 | Tonami et al. | |
| 2007/0098007 A1 | 5/2007 | Prodan et al. | |
| 2007/0229327 A1 | 10/2007 | Chen et al. | |
| 2008/0008471 A1 | 1/2008 | Dress | |
| 2008/0140686 A1 | 6/2008 | Hong et al. | |
| 2008/0141095 A1 | 6/2008 | Cai et al. | |
| 2009/0201805 A1 | 8/2009 | Begen et al. | |
| 2009/0241009 A1 | 9/2009 | Kong et al. | |
| 2009/0276686 A1 | 11/2009 | Liu et al. | |
| 2010/0036997 A1 | 2/2010 | Brewer et al. | |
| 2010/0229071 A1 | 9/2010 | Ganga et al. | |
| 2011/0099411 A1 | 4/2011 | Lin | |
| 2011/0134909 A1 | 6/2011 | Huang et al. | |
| 2011/0219279 A1 | 9/2011 | Abu-Surra et al. | |
| 2012/0119753 A1 | 5/2012 | Kim | |
| 2012/0137184 A1 | 5/2012 | Nakamura | |
| 2012/0240017 A1 | 9/2012 | Uchida | |
| 2012/0314586 A1 | 12/2012 | Yamamoto et al. | |
| 2013/0246878 A1 | 9/2013 | Pancholi et al. | |
| 2014/0006677 A1 | 1/2014 | Iyer et al. | |
| 2014/0112339 A1 | 4/2014 | Safranek et al. | |
| 2014/0115374 A1 | 4/2014 | Iyer et al. | |
| 2014/0115420 A1 | 4/2014 | Willey et al. | |
| 2014/0122963 A1 | 5/2014 | Motwani et al. | |
| 2014/0126580 A1 | 5/2014 | Sampath et al. | |
| 2015/0163170 A1 | 6/2015 | Birrittella | |
| 2015/0222533 A1 | 8/2015 | Birrittella et al. | |
| 2015/0256288 A1 | 9/2015 | Tanaka et al. | |
| 2015/0309873 A1 | 10/2015 | Yoon et al. | |
| 2015/0347015 A1 | 12/2015 | Pawlowski | |
| 2016/0085619 A1 | 3/2016 | Iyer et al. | |
| 2016/0099795 A1 | 4/2016 | Lusted et al. | |
| 2016/0179427 A1 | 6/2016 | Jen et al. | |
| 2016/0179610 A1 | 6/2016 | Morris et al. | |
| 2016/0179647 A1 | 6/2016 | Sharma et al. | |
| 2016/0179710 A1 | 6/2016 | Sharma et al. | |
| 2016/0179718 A1 | 6/2016 | Morris et al. | |
| 2016/0179730 A1 | 6/2016 | Halleck et al. | |
| 2016/0182265 A1 | 6/2016 | Shulman et al. | |
| 2016/0248682 A1 | 8/2016 | Lee et al. | |
| 2016/0261375 A1 | 9/2016 | Roethig et al. | |
| 2016/0283112 A1 | 9/2016 | Blankenship | |
| 2016/0283303 A1 | 9/2016 | Sharma et al. | |
| 2016/0283375 A1 | 9/2016 | Sharma et al. | |
| 2016/0283388 A1 | 9/2016 | Blankenship et al. | |
| 2016/0283399 A1 | 9/2016 | Sharma | |
| 2016/0337079 A1 | 11/2016 | Ran | |
| 2016/0377679 A1 | 12/2016 | Froelich et al. | |
| 2017/0004098 A1 | 1/2017 | Sharma et al. | |
| 2017/0017604 A1 | 1/2017 | Chen et al. | |
| 2017/0034165 A1 | 2/2017 | Bagal et al. | |
| 2017/0141794 A1 | 5/2017 | Tyson et al. | |
| 2017/0163286 A1 | 6/2017 | Wu et al. | |
| 2017/0222686 A1 | 8/2017 | Khan et al. | |
| 2017/0270062 A1 | 9/2017 | Sharma | |
| 2017/0351795 A1 | 12/2017 | Ghattas et al. | |
| 2018/0083855 A1 | 3/2018 | Weiny et al. | |
| 2018/0095923 A1 | 4/2018 | Iyer et al. | |
| 2018/0191523 A1 | 7/2018 | Shah et al. | |
| 2018/0205431 A1 | 7/2018 | Nammi | |
| 2018/0248650 A1 | 8/2018 | Sharma | |
| 2018/0254943 A1 | 9/2018 | Sharma | |
| 2019/0095380 A1 | 3/2019 | Sharma | |
| 2019/0149265 A1 | 5/2019 | Sharma | |
| 2019/0227972 A1 | 7/2019 | Hor et al. | |
| 2019/0243700 A1 | 8/2019 | Brewer | |
| 2019/0294579 A1 | 9/2019 | Sharma | |
| 2019/0305888 A1 | 10/2019 | Sharma | |
| 2019/0372904 A1 | 12/2019 | Dress | |
| 2020/0012555 A1 | 1/2020 | Sharma | |
| 2020/0145341 A1 | 5/2020 | Sharma | |
| 2020/0186414 A1 | 6/2020 | Sharma | |
| 2020/0226018 A1 | 7/2020 | Sharma | |
| 2020/0374037 A1 | 11/2020 | Sharma | |
| 2021/0006349 A1 | 1/2021 | Das | |

FOREIGN PATENT DOCUMENTS

| | | |
|---|---|---|
| JP | 2010187244 A | 8/2010 |
| WO | 2015099724 A1 | 7/2015 |
| WO | 2016053519 A1 | 4/2016 |
| WO | 2017014846 A1 | 1/2017 |

OTHER PUBLICATIONS

USPTO; Notice of Allowance issued in U.S. Appl. No. 16/575,739; dated Oct. 5, 2021; 35 pages.

Chen, Ling-Jyh, et al. "Improving Wireless Link Throughput via Interleaved FEC", Ninth International Symposium on Computers and Communications, Alexandria, Egypt, Jul. 2004, 6 pages.

EPO; Extended European Search Report in EP Application Serial No. 20153760.2, dated Mar. 26, 2020 (8 pages).

EPO; Extended European Search Report in EP Application Serial No. 20153970.7, dated Mar. 26, 2020 (7 pages).

EPO; Extended European Search Report issued in EP Patent Application No. 18761600.8, dated Dec. 2, 2020; 7 pages.

EPO; Extended European Search Report issued in EP Patent Application No. 20150933.8, dated Jul. 17, 2020; 8 pages.

EPO; Extended European Search Report issued in EP Patent Application No. 20165292.2, dated Jul. 10, 2020; 11 pages.

EPO; Extended European Search Report issued in EP Patent Application No. 20194485.7, dated Mar. 1, 2021; 9 pages.

EPO; Extended European Search Report issued in EP Patent Application No. 21167765.3, dated Jul. 21, 2021; 8 pages.

Feehrer, J., et al., "Implementation and modeling for high-performance I/O Hub used in SPARC M7 processor-based servers", 2015 IEEE 9th International Symposium on Embedded Multicore/Many-core Systems-on-Chip, IEEE, Conference Location: Turin, Italy, Date of Conference: Sep. 23-25, 2015, pp. 275-282. (Year: 2015).

Jiajia Jiao and Yuzhuo Fu, "A cost-effective method for masking transient errors in Noc flit type," 2013 IEEE 10th International Conference on ASIC, Shenzhen, 2013, pp. 1-4. (Year: 2013).

PCT International Preliminary Report on Patentability issued in PCT/US2018/019583, dated Sep. 3, 2019; 12 pages.

PCT International Search Report and Written Opinion in PCT/US2018/019702, dated Jun. 4, 2018, 11 pages.

PCT International Search Report and Written Opinion issued in PCT/US2018/019583, dated Jun. 5, 2018; 15 pages.

(56) References Cited

OTHER PUBLICATIONS

Srinivasan Murali et al: "Analysis of Error Recovery Schemes for Networks on Chips", IEEE Design & Test of Computers ( vol. 22 , Issue: 5, Sep.-Oct. 2005 ), Sep. 26, 2005 (Sep. 26, 2005), pp. 434-442, XP055628862, DOI: 10.1109/MDT.2005.104.
USPTO Final Office Action in U.S. Appl. No. 16/439,582 dated May 1, 2020 (12 pages).
USPTO Non-Final Office Action in U.S. Appl. No. 16/439,582 dated Sep. 18, 2020 (12 pages).
USPTO Non-Final Office Action dated Jan. 10, 2020, for U.S. Appl. No. 16/439,582, 11 pages.
USPTO; Corrected Notice of Allowability issued in U.S. Appl. No. 15/640,449, dated Jun. 24, 2020; 6 pages.
USPTO; Non-Final Office Action issued in U.S. Appl. No. 15/446,395, dated Jun. 1, 2018; 5 pages.
USPTO; Non-Final Office Action issued in U.S. Appl. No. 15/640,449; dated Apr. 7, 2020; 10 pages.
USPTO; Non-Final Office Action issued in U.S. Appl. No. 16/575,739, dated Jan. 7, 2021; 21 pages.
USPTO; Non-Final Office Action issued in U.S. Appl. No. 16/224,583, dated Apr. 8, 2020; 18 pages.
USPTO; Notice of Allowance issued in U.S. Appl. No. 15/446,395, dated Nov. 21, 2018; 8 pages.
USPTO; Notice of Allowance issued in U.S. Appl. No. 15/640,449, dated May 11, 2020; 6 pages.
USPTO; Notice of Allowance issued in U.S. Appl. No. 16/439,582, dated Jan. 12, 2021; 9 pages.
USPTO; Notice of Allowance issued in U.S. Appl. No. 16/224,583, dated May 12, 2020; 6 pages.
USPTO; Notice of Allowance issued in U.S. Appl. No. 16/948,459, dated Jun. 10, 2021; 42 pages.
USPTO; U.S. Appl. No. 17/134,240, filed Dec. 25, 2020; 60 pages.
Yao, Jun, et al., "PCIe Gen4 Standards Margin Assisted Outer Layer Equalization for Cross Lane Optimization in a 16GT/s PCIe Link", retrieved from the internet at https://www.researchgate.net/publication/316009959; DesignCon, Santa Clara, California; Feb. 2017; 27 pages.
USPTO; Final Office Action issued in U.S. Appl. No. 16/723,868, dated Aug. 26, 2021; 24 pages.
USPTO; Non-Final Office Action issued U.S. Appl. No. 16/575,739; dated Sep. 9, 2021; 27 pages.
USPTO; Notice of Allowance issued in U.S. Appl. No. 16/991,681; dated Sep. 9, 2021; 51 pages.
EPO; Extended European Search Report issued in EP Patent Application No. 21150857.7, dated Jul. 13, 2021; 13 pages.
USPTO; Non-Final Office Action issued in U.S. Appl. No. 16/428,341, dated Aug. 6, 2021; 9 pages.
India Patent Office; Office Action issued in IN Patent Application No. 202044010345, dated Nov. 5, 2021; 6 pages including English translation.

\* cited by examiner

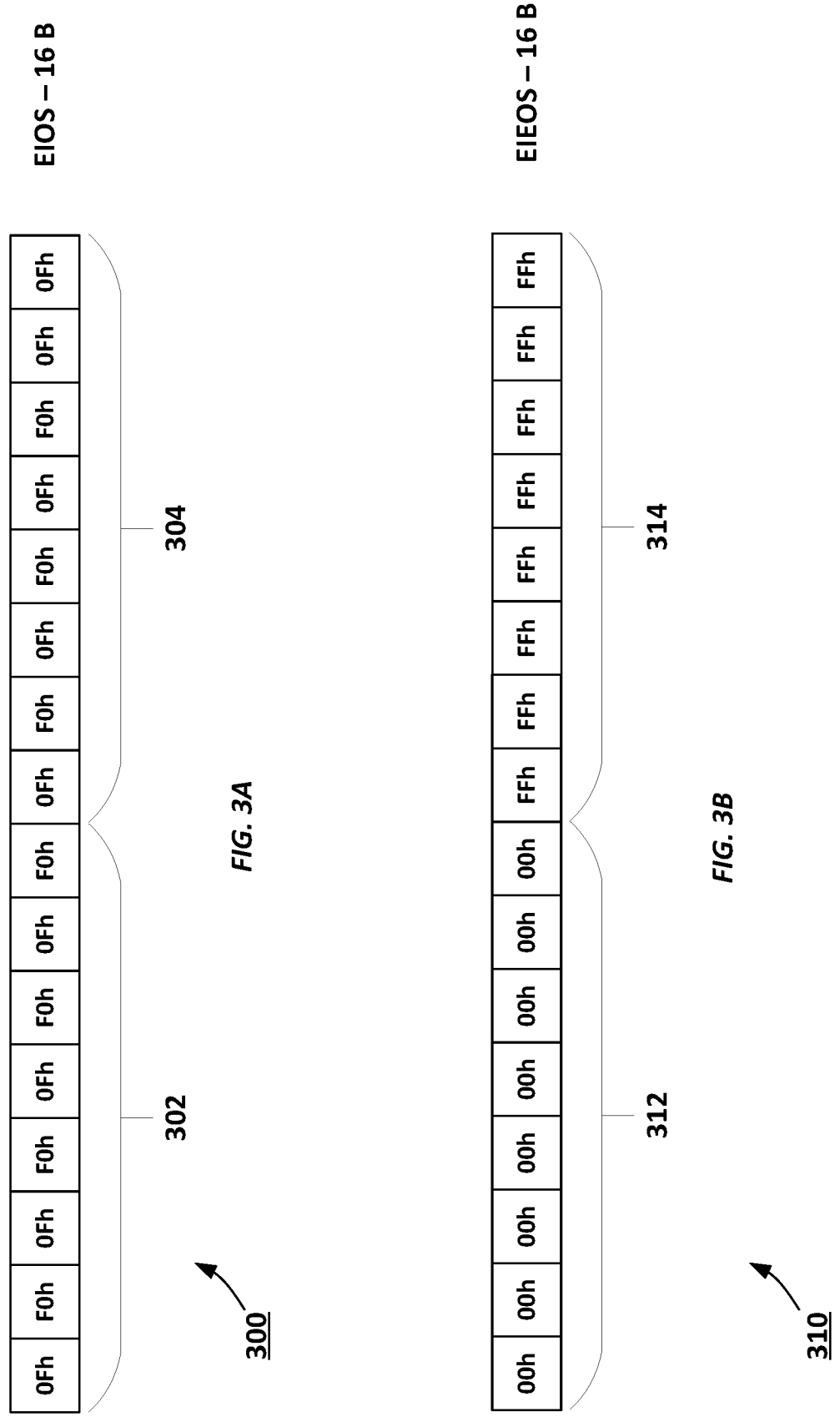

| Link | x1 | x2 | x4 | x8 | x16 |
|---|---|---|---|---|---|
| FEC size per lane (B) | 324 | 162 | 81 | 81 | 81 |
| FEC symbols per interleave | 108 | 54 | 27 | 27 | 27 |
| Total flit size (B) | 324 | 324 | 324 | 648 | 1296 |
| FEC latency (ns) | 40.5 | 20.25 | 10.125 | 10.125 | 10.125 |
| FEC check symbols | 6 | 12 | 24 | 48 | 96 |
| CRC (B) | 8 | 8 | 8 | 8 | 8 |
| DLL payload (B) | 4 | 4 | 4 | 4 | 8 |
| TLP payload (B) | 306 | 300 | 288 | 600 | 1184 |
| TLP payload (DW (1DW=4B)) | 76.5 | 75 | 72 | 147 | 296 |
| TLP efficiency (%) | 94.4 | 92.6 | 88.9 | 90.7 | 91.4 |

| TLP Header (DW) | TLP Payload (B/DW) | TLP (DW) | TLP Efficiency (%) |
|---|---|---|---|
| 4 | 0/0 | 4 | 62.7 |
| 4 | 32/8 | 12 | 80.6 |
| 4 | 64/16 | 20 | 83.6 |
| 4 | 128/32 | 36 | 88.5 |
| 4 | 256/64 | 68 | 91.2 |
| 4 | 512/128 | 132 | 92.6 |
| 4 | 4K/1K | 1028 | 93.8 |

ORDERED SETS FOR HIGH-SPEED INTERCONNECTS

CROSS REFERENCE TO RELATED APPLICATIONS

This application is a continuation (and claims the benefit of priority under 35 U.S.C. § 120) of U.S. application Ser. No. 16/723,868, filed Dec. 20, 2019, and entitled "ORDERED SETS FOR HIGH-SPEED INTERCONNECTS," which application claims the benefit of U.S. Provisional Patent Application having Ser. No. 62/846,913, filed on May 13, 2019, and entitled "ERROR PROTECTION FOR ORDERED SETS IN COMPUTER BUSES." The disclosures of the prior applications are considered part of and are hereby incorporated by reference in their entirety in the disclosure of this application.

BACKGROUND

Ordered sets are physical layer packets that can be used by interconnect link partners for various control functionality. For example, ordered sets can be used for link training, power management, flow control, and other physical layer functions.

BRIEF DESCRIPTION OF THE DRAWINGS

FIG. 3A is a schematic diagram illustrating example electric idle ordered sets in accordance with embodiments of the present disclosure.

FIG. 3B is a schematic diagram illustrating example electric idle exit ordered sets in accordance with embodiments of the present disclosure.

FIG. 15 shows a table of flit characteristics for exemplary flit definitions with per-lane FEC schemes for various PCIe link widths.

FIG. 17 shows a table of PCIe 5.0 TLP efficiencies.

Figure 1:
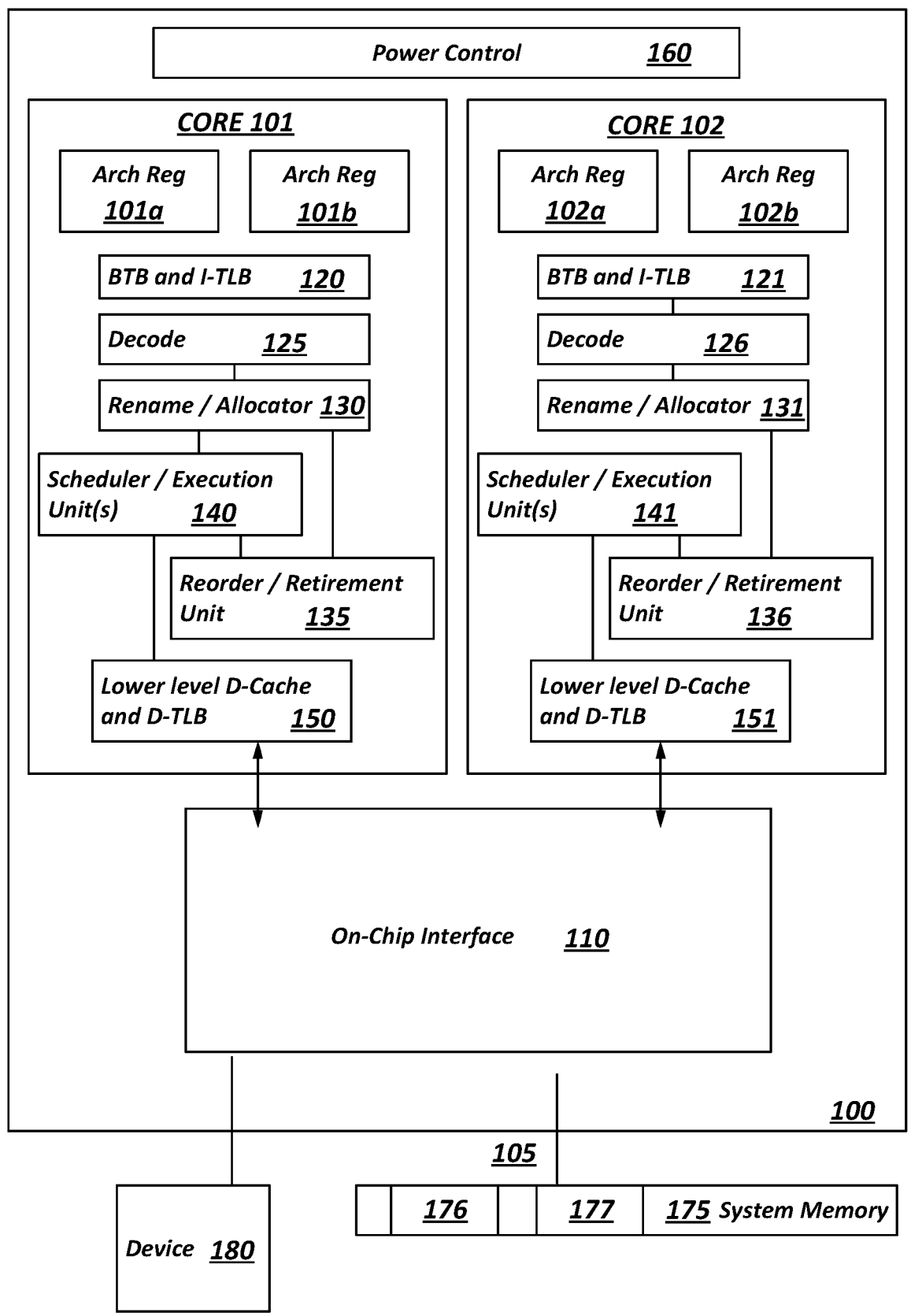
FIG. 1 illustrates an embodiment of a block diagram for a computing system including a multicore processor.

Figures are not drawn to scale.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores-core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores-core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Figure 2A:
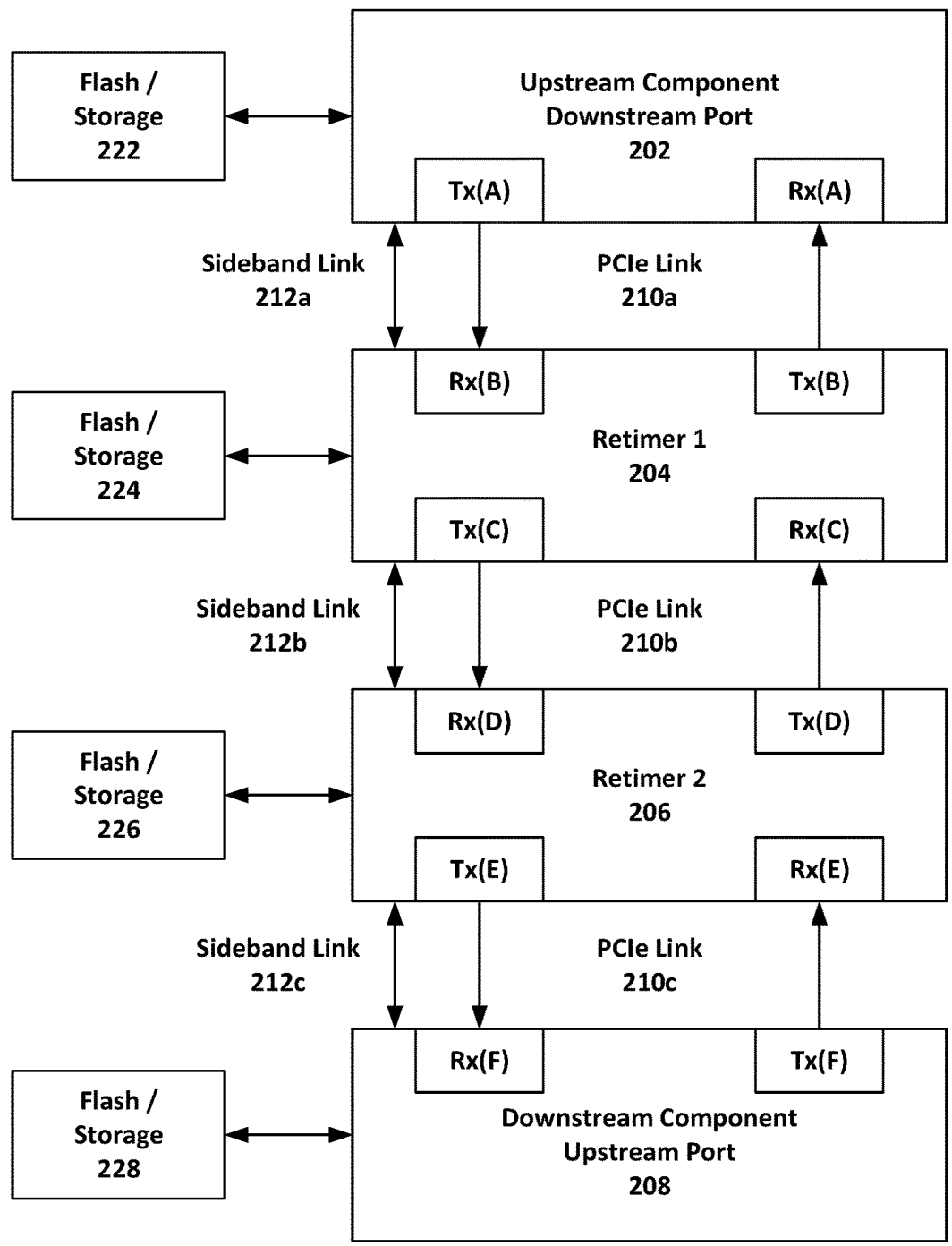
FIG. 2A is a schematic diagram of an interlinked system that includes two retimers in accordance with embodiments of the present disclosure.

FIG. 2A is a schematic and timing diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, orjust TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a similar storage element 224. The retimer 2 206 can optionally include a similar storage element 226. The downstream component upstream port 208 can optionally include a similar storage element 228.

Figure 2B:
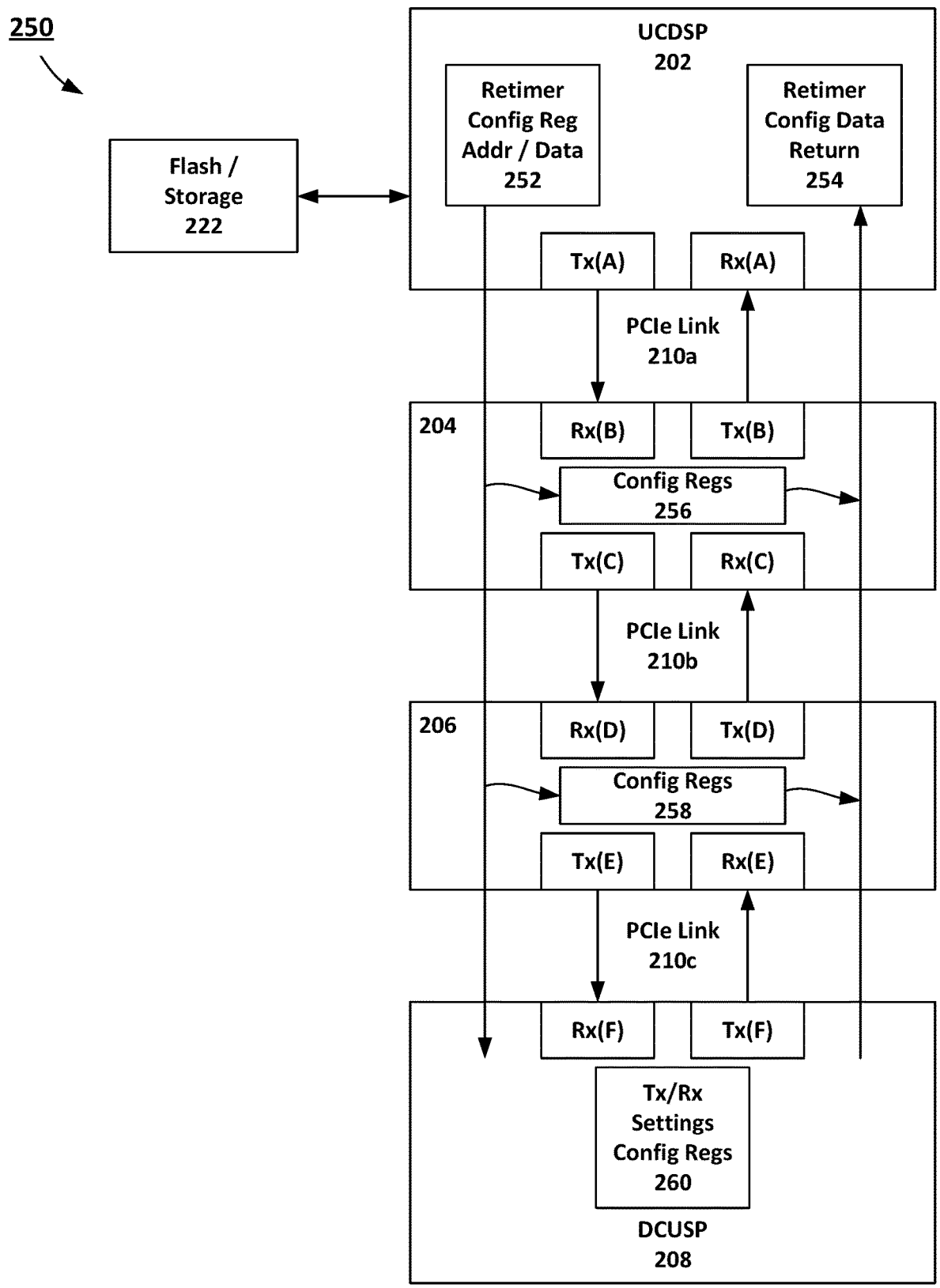
FIG. 2B is a schematic diagram of a connected system that illustrates in-band upstream port and retimer configuration in accordance with embodiments of the present disclosure.

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210*a-c* that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a command code, data, or an address for use at a configuration register (e.g., 256, 258) of a retimer (e.g., 204, 206, respectively) to read or write data from/to the register 256, 258. Retimers can respond to configuration access commands sent by encoding data in an instance of an enhanced SKP OS by itself encoding response data in a subsequent instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Continuing with the example of FIG. 2B, in connection with a mechanism for providing in-band access to retimer registers, the retimer may have architected registers that are addressable with well-defined bits and characteristics. In this example, an enhanced SKP OS is defined/modified as the physical layer-generated periodic pattern to carry the commands/information from "Retimer Config Reg Addr/Data" (e.g., 252) to the re-timers and carrying the responses from the re-timers back to load to "Retimer Config Data Return" (e.g., 840), with some bits allotted for CRC for the protection of data. For example, in PCIe this can include enhancing the existing SKP Ordered Set (e.g., with CSR Access and CSR Return (CRC-protected bits)). Further, a flow for ensuring guaranteed delivery of the commands/information to retimer and the corresponding response back can be defined. The physical layer mechanism can be enhanced to also include notifications from the re-timer (in addition to response) if it needs some sort of service, among other examples features.

PCIe Generation 6 and beyond can use Pulse Amplitude Modulation (PAM-4) with forward error correction (FEC) to run at 64 GT/s at an effective Bit Error Rate (BER) for the data stream in an acceptable range. FEC and flits for data blocks for data blocks are often used for normal operations when the Link is in an active (L0) power state.

Ordered Sets (OS), however, cannot be protected by the same FEC mechanism because many, if not most, OS are not scrambled. For example, Electrical Idle Exit Ordered Sets (EIEOS) are used to reset the scrambler, provide a low-frequency pattern, and obtain block alignment. So EIEOS are not scrambled and should not be changed with error correcting code (ECC) bits. Skip Ordered Sets (SKP OS) can be of variable length as SKP OS can be added or deleted by Retimers. Therefore, using FEC to cover all Ordered Sets is challenging, each OS with its own unique set of requirements and length. This disclosure describes error protection mechanisms for Ordered Sets in a high-BER Interconnect Link, such as a link based on a PCIe Gen 6 or above protocol, while preserving the characteristics and functionality associated with each Ordered Set.

In this disclosure, a physical layer device can partition a 128b OS into two 64-b (8B) portions or chunks. Replicated along with CRC/parity protection is used for improved reliability and availability.

Ordered sets fall into two broad categories each with a different approach for high raw BER:

An Ordered Set such as TS1/TS2 is considered good if either an 8B chunk is good, each of which is independently CRC protected.

An Ordered Set such as SKP OS (creates or removes delay between link partners), EIEOS (retraining), EIOS (lower power state) sent after a Data Stream, need both 8B chunks to be good to be considered a good OS. Therefore, each 8B chunk has its own built-in redundancy to improve its effective BER.

Control SKP Ordered Set payload such as Parity and margin command/status fields will be sent in a predetermined flit in lieu of the data link layer payload to avoid aliasing in the Ordered Sets due to the high raw BER in the Link.

The techniques and devices described herein result in preserving the existing PCIe Ordered Set mechanisms while providing reliability and availability with a high BER expected in Gen 6.

This disclosure defines each Ordered Set (OS) to be a 128 bit (16 Byte) block. Each 128 bit OS block includes two 64 bit (8B) chunks or portions. This apportioning is done to handle a fault model where each burst is of length <=16. If the burst length is longer, the same principles apply by making the Ordered Set longer. For example, if the burst length is <=32, each OS can be 256 bits comprising of two 128 bit chunks. Table 1 illustrates effective bit error rates (BER) achieved using OS apportioning.

TABLE 1

Effective bit error rates (BER) achieved using OS apportioning.

|  | Gen 1-5 | Gen 6 |  |  |  |  |  |
|---|---|---|---|---|---|---|---|
| Raw burst error probability | 1E−12 | 0.0001 | 0.00001 | 0.000001 | 1E−7 | 1E−8 | 1E−9 |
| OS basic size | 130 | 64 | 64 | 64 | 64 | 64 | 64 |
| Probability of error |  |  |  |  |  |  |  |
| 0 | 1 | 0.993620118 | 0.99936 | 0.999936 | 0.999994 | 9999994 | 0.99999994 |
| 1 | 1.3E−10 | 0.006359805 | 0.00064 | 6.4E−5 | 6.4E−6 | 6.4E−7 | 6.4E−8 |
| 2 | 8.385E−21 | 2.00354E−5 | 2.01E−7 | 2.02E−9 | 2.02E−11 | 2.016E−13 | 2.016E−15 |

TABLE 1-continued

Effective bit error rates (BER) achieved using OS apportioning.

| | Gen 1-5 | Gen 6 | | | | | |
|---|---|---|---|---|---|---|---|
| 3 | 3.5776E−31 | 4.14106E−8 | 4.16E−11 | 4.17E−14 | 4.17E−17 | 4.166E−20 | 4.1664E−23 |
| Prob of >= 1 error in OS basic size (no single error correct) | 1.3E−10 | 0.006379882 | 0.00064 | 6.4E−5 | 6.4E−6 | 6.4E−7 | 6.4E−8 |
| Prob of >= 2 errors in OS basic size (single error correct) | | 2.00768E−5 | 2.02E−7 | 2.02E−9 | 2.02E−11 | 2.016E−13 | 2.016E−15 |
| Error prob when OS needs either of two 8B all correct (TS1/TS2) | | 4.07029E−5 | 4.09E−7 | 4.1E−9 | 4.1E−11 | 4.096E−13 | 4.096E−15 |
| Error prob when both 8B needed to be correct but need 5B in each 8B | | 4.03078E−10 | 4.06E−14 | 4.06E−18 | 4.06E−22 | 4.064E−26 | 4.0643E−30 |

Each OS falls into two broad categories; each with a different approach for handling high raw BER using the two 8B chunks:

An Ordered Set such as TS1/TS2 is considered good if either 8B chunk is good, each of which is independently CRC protected.

An Ordered Set such as SKP OS, EIEOS, EIOS sent after a Data Stream, need both 8B chunks to be good to be considered a good OS. However, each 8B chunk has its own built-in redundancy to improve its effective BER.

These replication across two 8B chunks or within each 8B chunk helps the OS to have the same effective error probability of 1.3E-10 in most of the cases, as shown in Table 1 below. There are some cases (e.g., TS1/TS2 with a raw BER of 1E-4) where the number falls short. Those can be addressed by replication across Ordered Sets (e.g., send 24 TS2 Ordered Sets instead of 16 TS2 Ordered Sets in PCIe Gen 1-5).

In this disclosure, the sync header that distinguishes between an OS (128b) vs a Data Block is not used. Instead, SKP Ordered Sets are sent at a fixed interval. Once a Data Stream starts, SKP Ordered Set continues at that fixed interval. However, a SKP OS can be substituted by an Electrical Idle Exit Ordered Set (EIEOS) if the Link needs to transition from an active state (L0) to Recovery; the SKP OS can be substituted for an Electrical Idle Ordered Set (EIOS) if the Link needs to transition to a low-power state such as L0s or L1 from L0. Thus, while in a data stream, a Receiver can be configured to recognize one of the 3 OS: SKP OS, EIEOS, or EIOS during certain intervals. During that 16B aligned block, the Receiver can distinguish between one of the three OS, assuming the burst length it is supposed to correct.

FIG. 3A is a schematic diagram illustrating example electric idle ordered sets (EIOS) 300 in accordance with embodiments of the present disclosure. The EIOS 300 is shown as 16 bytes (or two 8 byte portions 302 and 304). Redundancy is also shown, where each 8B portion is repeated. FIG. 3B is a schematic diagram illustrating example electric idle exit ordered sets 310 in accordance with embodiments of the present disclosure. The EIEOS 310 is shown as 16 bytes (or two 8 byte portions 312 and 314). Redundancy is also shown, where each 8B portion is repeated.

Figure 3C:
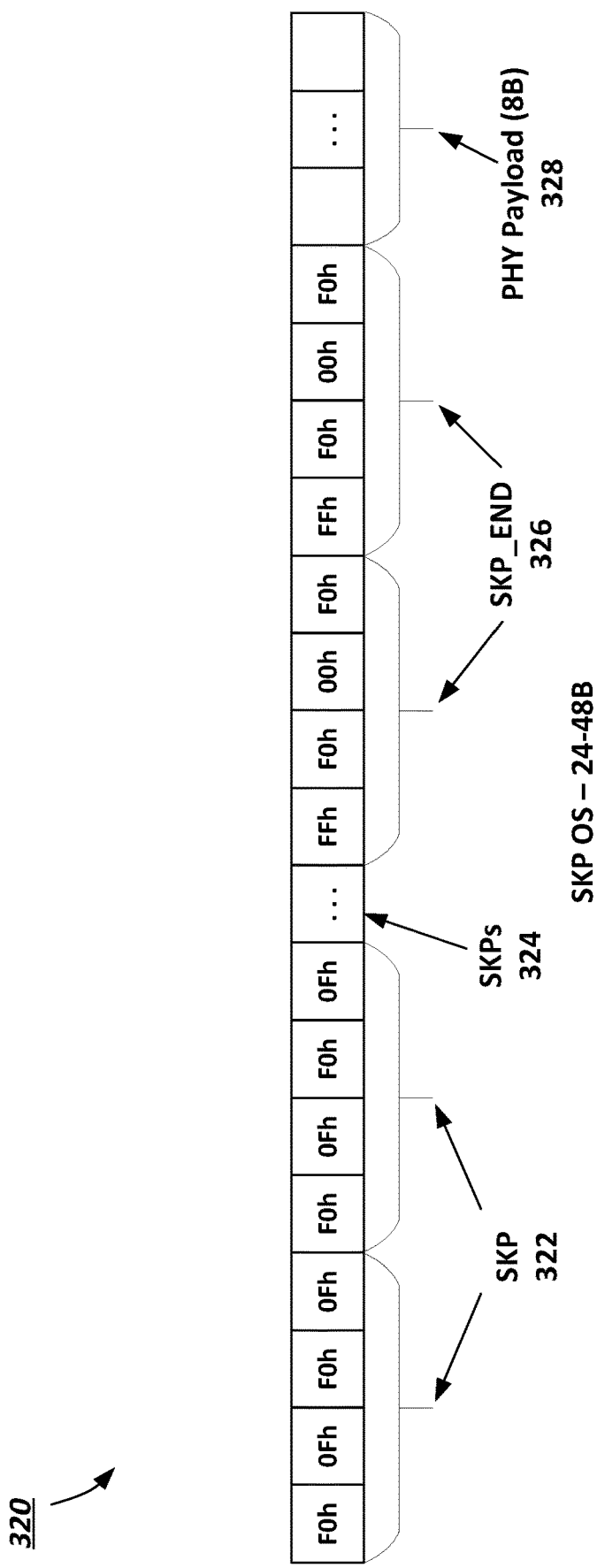
FIG. 3C is a schematic diagram illustrating example skip ordered sets in accordance with embodiments of the present disclosure.

FIG. 3C is a schematic diagram illustrating example skip ordered sets 320 in accordance with embodiments of the present disclosure. FIG. 3C illustrates SKP OS 322 as an 8B portion, and with other SKP OS portions 324. In embodiments, 24-48B of SKP OS can be used. SKP_END OS 326 can represent the end of the SKP OS, and can also be portioned into 8B portions. The PHY payload 328 can be scheduled after the SKP_END OS 326. The PHY Payload can also be replicated in a similar manner as other OS for redundancy. That is, the PHY payload can be apportioned into two 8 byte portions, with each of the 8 byte portions carrying the same information.

FIGS. 3A-C illustrates example encoding for the three Ordered Sets that can be received immediately after a Data Block, at the scheduled SKP OS interval. The EIEOS 300 is chosen to preserve the 1 GHz low-frequency content. The EIOS and SKP OS are chosen to have a reasonable hamming distance between the 4B aligned encodings between EIOS 300, EIEOS 310, and SKP/SKP_END OS 320, as shown in Table 2 below. Those skilled in the art will recognize that this will prevent any aliasing with a burst error of <=16. The values shown in Table 2, along with the respective hamming distances, can be used as expected values against which received OS can be compared. One or both of the redundant OS received can be checked against expected values to determined OS type and whether the received OS contains errors.

TABLE 2

Encoding differences between various OS.

| Comparison (aligned 4B) | Difference |
|---|---|
| SKP vs SKP_END | 0FFF_F0FF |
| SKP/SKP_END vs EIOS | FFFF_FFFF/F000_0F00 |
| SKP/SKP_END vs EIEOS | F00F_F00F/FFF0_00F0 |
| (all 0s vs all Fs in first 8B vs the last 8B) | (0FF0_0FF0/000F_FF0F) |

Figure 4:
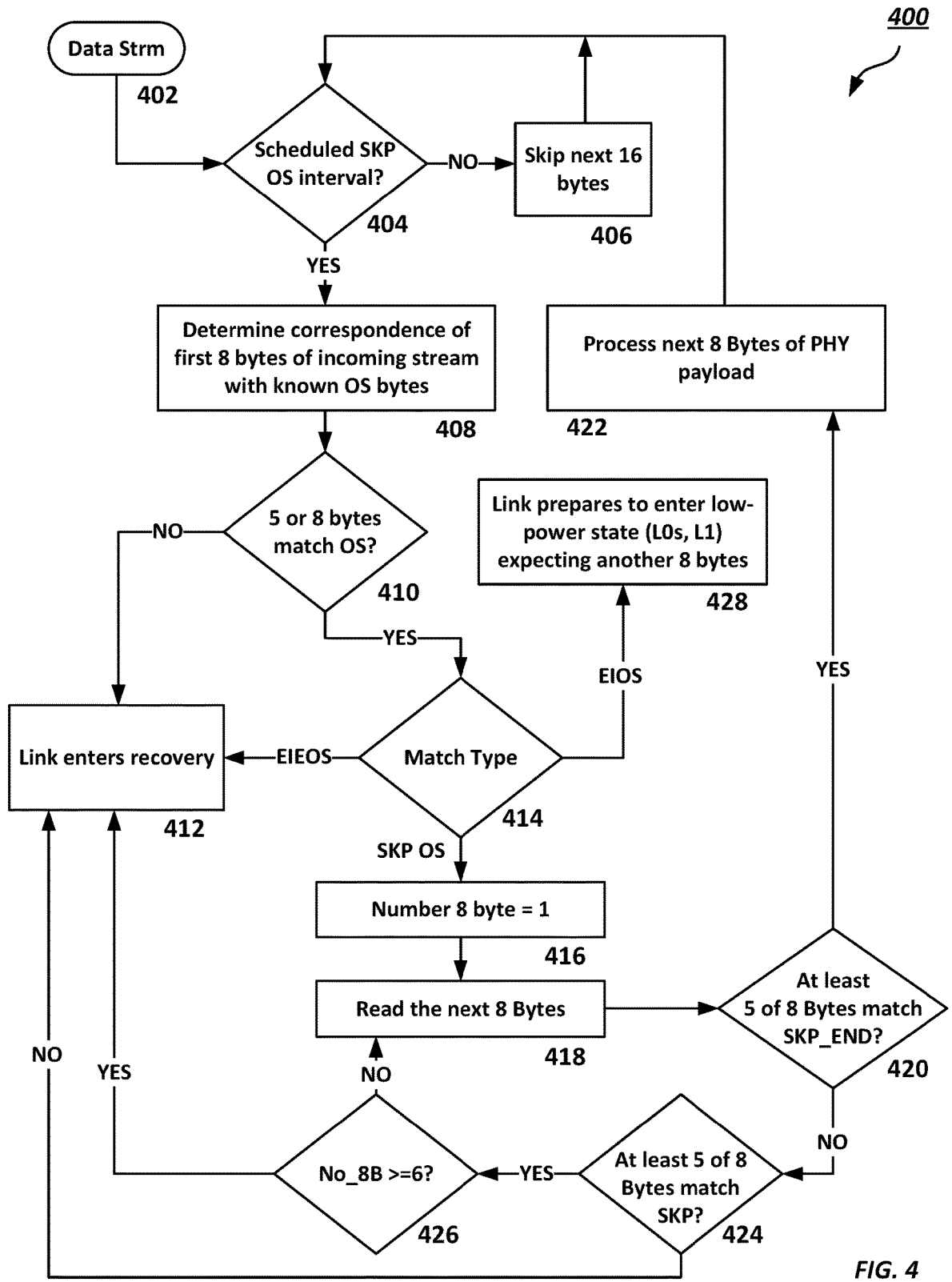
FIG. 4 is a process flow diagram for processing ordered sets in accordance with embodiments of the present disclosure.

FIG. 4 is a process flow diagram 400 for processing ordered sets in accordance with embodiments of the present disclosure. The process flow chart 400 demonstrates the techniques described herein for identifying the appropriate Ordered Set, even in the presence of errors, and taking the appropriate action.

In this disclosure, SKP Ordered Sets arrive at a receiver at a regular interval, as described later. During a data stream 402, the receiver skips checking for OS 406 if the received data is outside the SKP OS interval 404.

During a data stream 402, at the interval where an OS (such as a SKP OS) is expected 404, the receiver distinguishes between the three OS that can show up in that position. The receiver checks for 5 out of 8 Bytes matching with the corresponding Byte position (408), (410). This check ensures any error affecting up to 3 Bytes (a burst of length <=16 will impact at most 3 Bytes) can be corrected and will result in a match. If no match is found, it implies more errors, and the Link enters Recovery, to retrain the Link (412). If 5 of 8 bytes match (410), then the receiver can determine an OS type between SKP OS, EIOS, and EIEOS (414). Receiving an EIOS indicates that the Link will enter a low-power state (L0s, L1) after the next 8 Bytes (428). Receiving an EIEOS puts the Link to Recovery (412).

If the receiver receives a SKP OS after having read the first 8B (416), the receiver continues to check the next 8 Bytes for either a SKP or a SKP_END (418). If 5 out of 8 Bytes match an expected SKP_END OS, it indicates the Data Stream after the 8 Bytes of PHY payload at the end of the SKP OS. The PHY payload can be processed (422) and the receiver returns to checking for OS during scheduled OS intervals (404).

A received SKP OS can be 24, 32, 40, 48, or 56 Bytes long. So that check (for a SKP or a SKP_END) can happen for up to 5 times, if the receiver continues receiving SKP OS. If at least 5 of the 8 Bytes match SKP OS (424), the receiver can check that the number of 8B SKP OS received does not exceed 5. If the number of 8B SKP OS is greater than or equal to 6 (exceeds 5), the link can enter recovery (412). If at least 5 of the 8 Bytes do not match SKP OS (424), then the link enters recovery (412). If neither SKP nor SKP_END OS is found or the SKP vs SKP_END OS check has already happened 5 times and the receiver has been receiving a continuous stream of SKP OS, the Link enters Recovery since it indicates an uncorrectable error.

If the number of SKP or SKP_END does not exceed 5, the receiver can read the next 8B (418) and continue from there to check SKP OS or SKP_END OS.

In this disclosure, SKP OS are inserted at a fixed intervals. This is chosen to be aligned to flow control unit (flit) boundary. During a Data stream, a SKP OS can be inserted at a flit boundary or inserted within a TLP in progress which straddles two (or more) flits.

Each Retimer can insert or delete two SKPs (i.e., 8 Bytes). A SKP OS transmitted by a Port can be 40 Bytes, but when received at a Port, the SKP OS can be 24, 32, 40, 48, or 56 Bytes. Since 8 Bytes are added or deleted in each Port/Pseudo-Port, the SKP OS insertion interval can be made twice as long as PCIe Gen 3-5 (i.e., 740 Blocks for SRNS or Common Clock and 74 Blocks for SRIS, where 1 Block=16 Bytes per Lane).

In Gen 4 and Gen 5 Data Rates, Control SKP Ordered Set was used for payload such as Parity and margin command/status fields. In Gen 3 through Gen 5 Data Rates, SKP OS carried parity information to identify the Lane segment in error along with the LFSR (Linear Feedback Shift Register) value for that Lane. Control SKP OS and SKP OS alternate in Gen 4 and Gen 5 Data Rates. With a burst error expected in a high BER Link, the techniques described herein append the this information in the last 8 Bytes of the SKP OS interval with replication, as shown in Table 3.

TABLE 3

| PHY layer payload at the end of the SKP OS. | |
|---|---|
| PHY Payload Bit | Field |
| 0 [32] | Payload Type: Margin Payload if 0b; else LFSR |
| 1, 2, 3 [33, 34, 35] | Parity bits (Port parity, Retimer 1 Parity, Retimer 2 Parity) |
| 4:27 [36:59] | {LFSR[2:0], Margin Payload, Margin CRC, Margin Parity} if Margin payload Else {Parity of LFSR[22:0], LFSR[22:0]} |
| 28 [60] | Payload Type Margin Payload if 0b; else LFSR |
| 29, 30, 31 [61, 62, 63] | Parity bits (port parity, Retimer 1 Parity, Retimer 2 Parity) |

Despite one type of SKP OS being used, the Payload alternates between linear feedback shift register (LFSR) sequences and Margin Command/Status, similar to Gen 4 and Gen 5. The "Payload Type" field indicates what type of payload is sent and is replicated 4 times. Similarly, the Port Parity, reflecting the even parity of all the bits in the previous flits starting from after the SDS OS or the prior SKP OS, whichever earlier, to the flit before the current SKP OS, along with 2 bits reflecting each Retimer's computation of parity is sent 4 times. The Payload Type along with the three parity bits are replicated 4 times. A majority voting is employed across all this 4-bit vector to determine which one is correct. The LFSR is sent two times along with its corresponding even parity and compared to deploy the correct one. The Margin Payload along with the Margin CRC/parity is sent twice. If one set of the two copies passes its parity and CRC check, it will be used as a valid copy.

Link (Re)Training is handled through the TS1/TS2 Ordered Sets with the EIEOS sent every 32 TS1/TS2 Ordered Sets. Link (re)training occurs in Recovery and Configuration states. If the Link was in Electrical Idle prior to entering Recovery, the EIEOS is used to wake up the Link Partner. This disclosure will send 4 back to back EIEOS followed by 32 TS1 Ordered Sets in a repeating pattern. The 4 back to back EIEOS is sent to ensure that a low-frequency pattern (of 0.5 GHz) stays for 8 ns for the exit electrical idle (EI) detection circuitry of the Link Partner to wave up. Once the Link Partner wakes up, as evidenced by recording an exit EI signal (and optionally some progress in establishing bit lock), the Link can send one EIEOS every 32 TS1/TS2

Ordered Sets to minimize the link (re)training time. The TS1/TS2 Ordered Set carries a lot of information bits. However, not all the information bits are required in all the states. Since the Link has a high BER, the proposed invention splits each TS1/TS2 Ordered Set (16 Symbols, each Symbol being a Byte) into two identical halves, as shown in Table 4 below. Symbol 0 (and 8) is the TS1 identifier, which is unscrambled. The information bits that do not need to overlap in each of the states are sent on the same Symbol. For example, Link Number and Lane Number is meaningful in states like Configuration—not in Recovery. Equalization information (denoted as EQ Bytes 0-3) are useful only in Recovery states (and mostly in Recovery.EQ sub-state)—so they are sent during those states. So Symbol 1 and 2 EQ Bytes in Recovery states but carry Link No/Lane No in other states, as shown in Table 4 below. This helps to send the relevant information more often within the same number of Bytes to effectively correct errors. Each 7 Bytes is protected by an 8-bit CRC which is sent in Symbol 8/15. It should be noted that since identical Symbols are 8 Bytes apart, a burst error <=64 bits will not impact the copy. The only OS that can coexist during (re)training are TS1/TS2, EIEOS, and SKP OS.

an 8 Byte aligned boundary and the SDS is accepted as long as at least four good E1_87_87_87 (4B) sets in 4B aligned boundary are received over the 32 Bytes of SDS (as described by FIG. 4). The SDS marks the beginning of a new Data Stream (664). The SDS can also be used to establish lane to lane deskew.

This disclosure describes the following rules during training for built-in error correction with reliability:

A received TS1/TS2 is considered valid as long as Symbols 0-7 or Symbols 8-15 pass CRC/parity check. If both sets pass CRC/parity but do not match each other, the one that matches a prior TS1/TS2, if any, is accepted as valid. If there are no prior TS1/TS2 and both the sets mismatch, we can accept either one as the valid TS1/TS2.

An EIEOS can be used to obtain block alignment prior to deciphering TS1/TS2 Ordered Sets. The block boundary is updated if a subsequent EIEOS is on a different boundary.

The SKP OS can be received and initial checks can be stringent to match all Bytes for the SKP and SKP_END (instead of the 5 out of 8 Bytes match). A SKP OS interval can be established with at least two SKP OS prior to sending TS2 Ordered Sets.

TABLE 4

TS1/TS2 Ordered Sets.

| Symbol No | Field/State | Scrambled | Usage/Value |
|---|---|---|---|
| 0, 8 | TS1/TS2 Identifier | No | 1 Eh/2 Dh |
| 1, 9 | Link No-non-Recovery states EQ Byte 0-Recovery | Yes | |
| 2, 10 | Lane No-non-Recovery states EQ Byte 1-Recovery | Yes | |
| 3, 11 | NFTS | Yes | |
| 4, 12 | Data Rate Identifier | Yes | |
| 5, 13 | EQ Byte 2 | Yes | |
| 6, 14 | Training Control-in non-Recovery.EQ substates EQ Byte 3-Recovery.EQ | Yes | |
| 7, 15 | 8b CRC over Symbols 0-6 (or 8-14) OR DC-balance [or byte parity] | Yes/No | 8 bit CRC OR DC Balance: 20 h or DFh |

Figure 5:
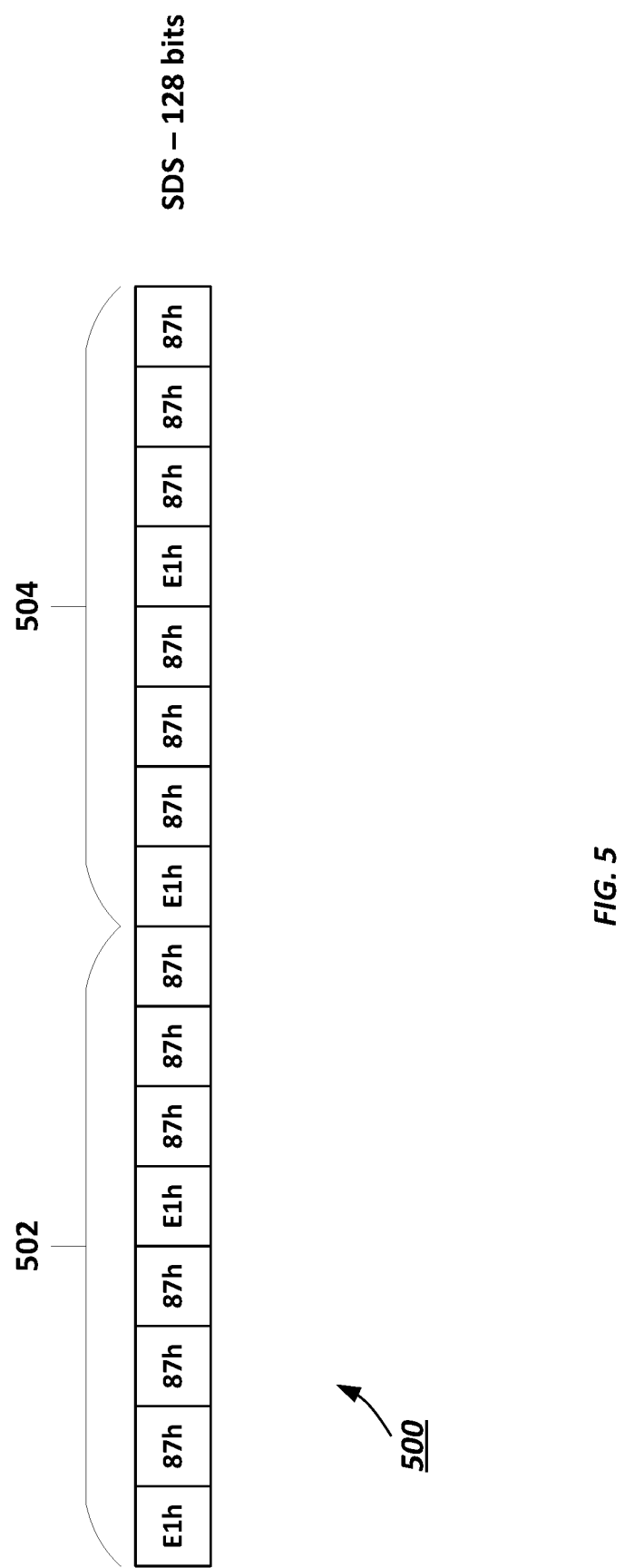
FIG. 5 is a schematic diagram illustrating example start data stream ordered sets in accordance with embodiments of the present disclosure.

FIG. 5 is a schematic diagram illustrating example start data stream ordered sets 500 in accordance with embodiments of the present disclosure. The start data stream (SDS) OS provide markers prior to the beginning of the data stream. The SDS OS indicate an end of TS2. Therefore, the start of SDS OS an also indicate the end of TS2 OS. The built-in redundancy of SDS OS is shown by 8B portion 502 and 8B portion 504.

Figure 6A:
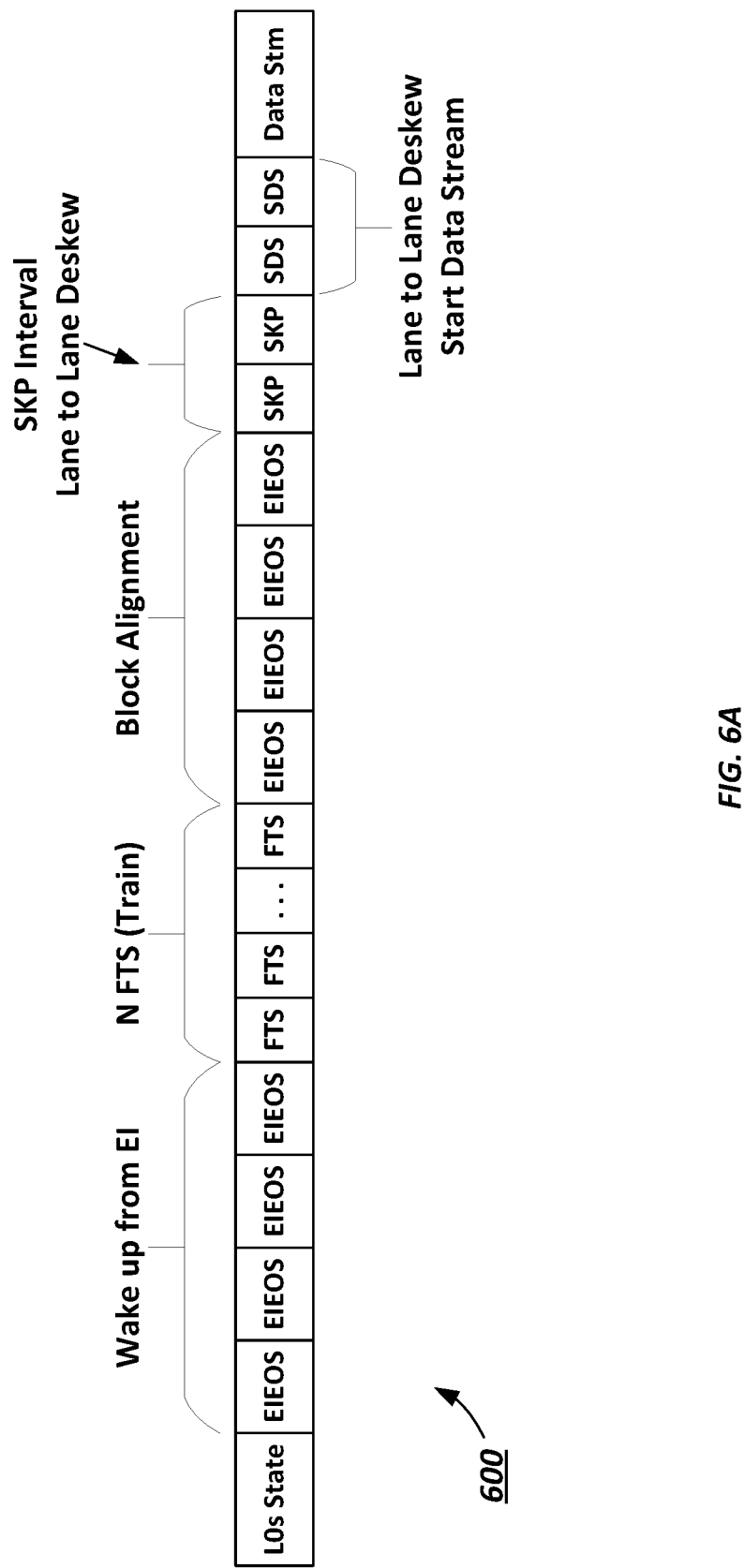
FIG. 6A is a schematic diagram illustrating example ordered sets for waking from a low power state in accordance with embodiments of the present disclosure.
Figure 6B:
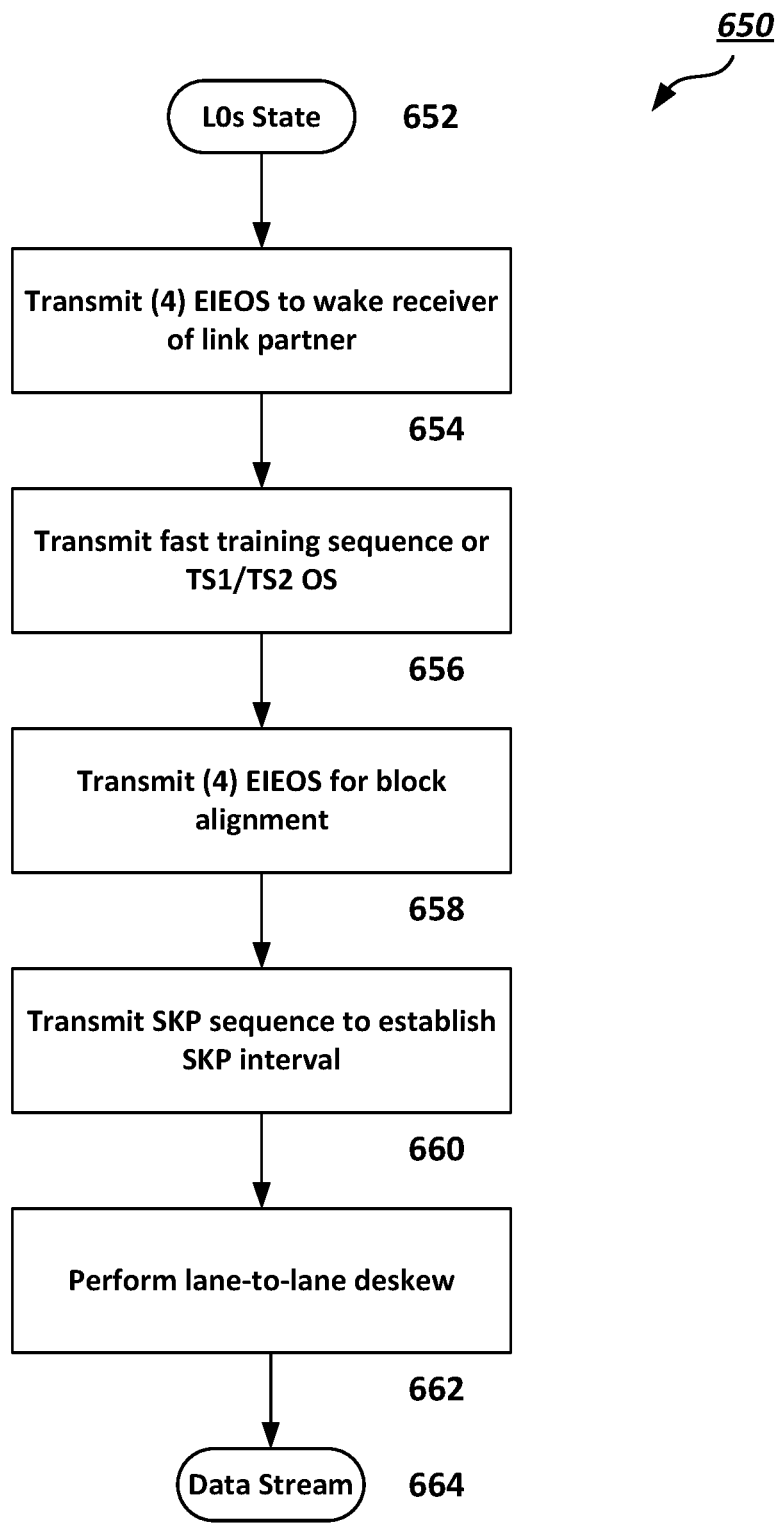
FIG. 6B is a process flow diagram for processing ordered sets for waking from a low power state in accordance with embodiments of the present disclosure.

FIG. 6A is a schematic diagram illustrating example ordered sets for waking from a low power state in accordance with embodiments of the present disclosure. FIG. 6B is a process flow diagram for processing ordered sets for waking from a low power state in accordance with embodiments of the present disclosure. A receiver can be in a low power state (e.g., a L0s state) (652). On exit from a low-power state, the techniques described herein follows the sequence shown in FIGS. 6A-B. At the outset, an initial 4 EIEOS can cause the receiver of a link partner to wake up from the low power state (654). Following that, the N fast training sequence (FST) gets the receiver to achieve bit lock (656). In some embodiments, TS1/TS2 OS can be used instead of the N FST. Then, EIEOS (1-4 OS) can be used to achieve block alignment (658). Following block alignment, a SKP OS sequence (40 Bytes) can be used to establish the SKP interval (660) and perform Lane to Lane Deskew (662). The SKP/SKP_END OS are checked using 5 good bytes in Two back to back SDS can be sent prior to starting the Data Stream, neither of which should overlap with the location of the start of the SKP OS at the Transmitter.

An SDS is considered "received" in an aligned 128b (16B) boundary if:

1) the SDS is not the location of a SKP OS starting point;
2) the receiver has received the mandatory number of TS2'es per LTSSM rules;
3) the receiver has received four good E1_87_87_87 (4B) sets, at least two of which is in an odd 4B aligned position (i.e. Bytes 0-3, 8-11). (This third rule ensures that the receiver checks directly against the fixed TS2 unscrambled bytes; EIEOS is checked naturally since it is unscrambled in all bytes, in a similar way as the SDS).

A Receiver can receive two SDS back to back to start receiving the Data Stream.

Even though the disclosure is described in the context of PCIe Gen 6, those skilled in the art will realize that the concepts are applicable to other interconnects (such as future generations of multi-Lane Links such as coherency/memory links, USB, etc.) if OS are used.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
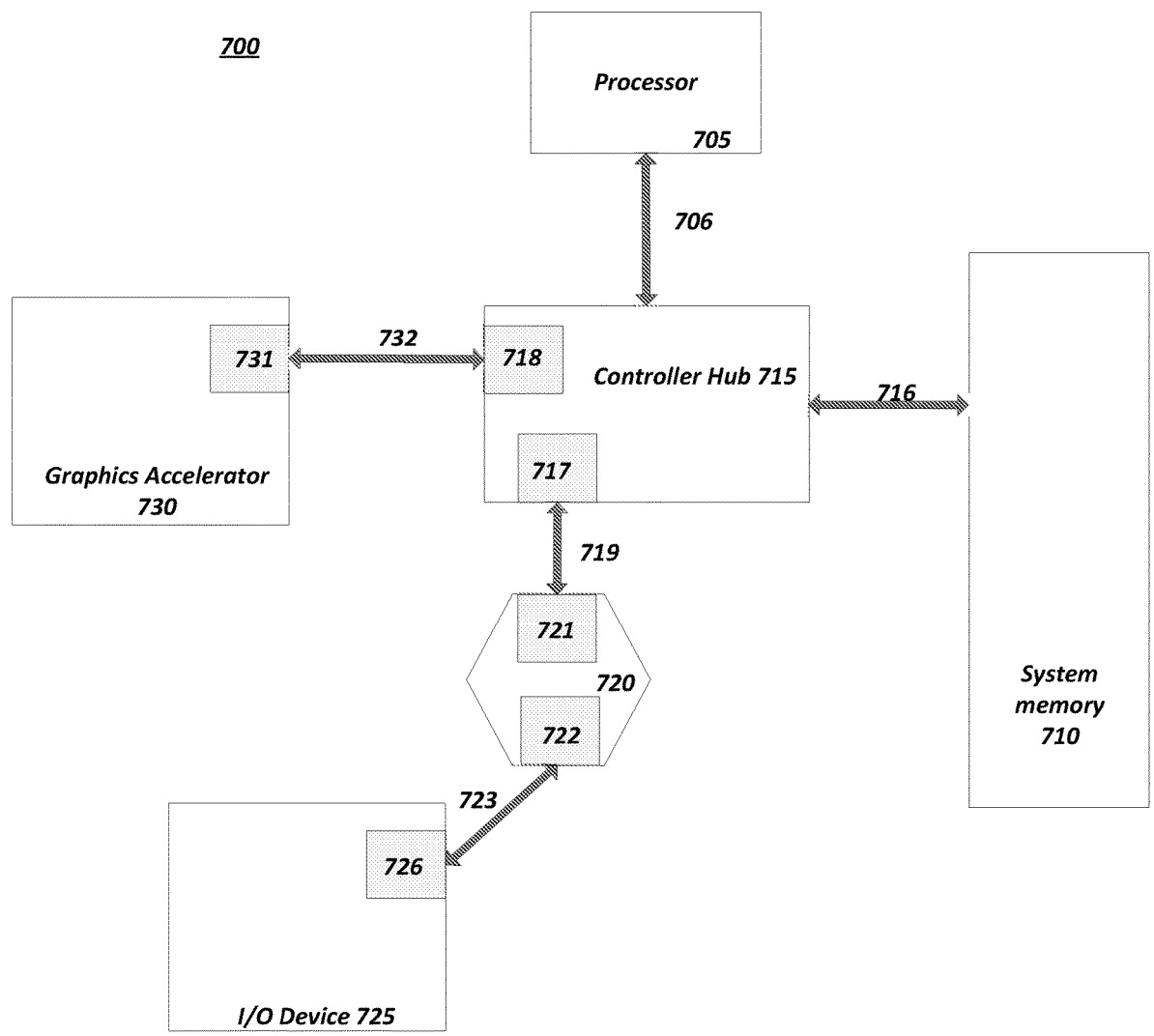
FIG. 7 illustrates an embodiment of a computing system including an interconnect architecture.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root port controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
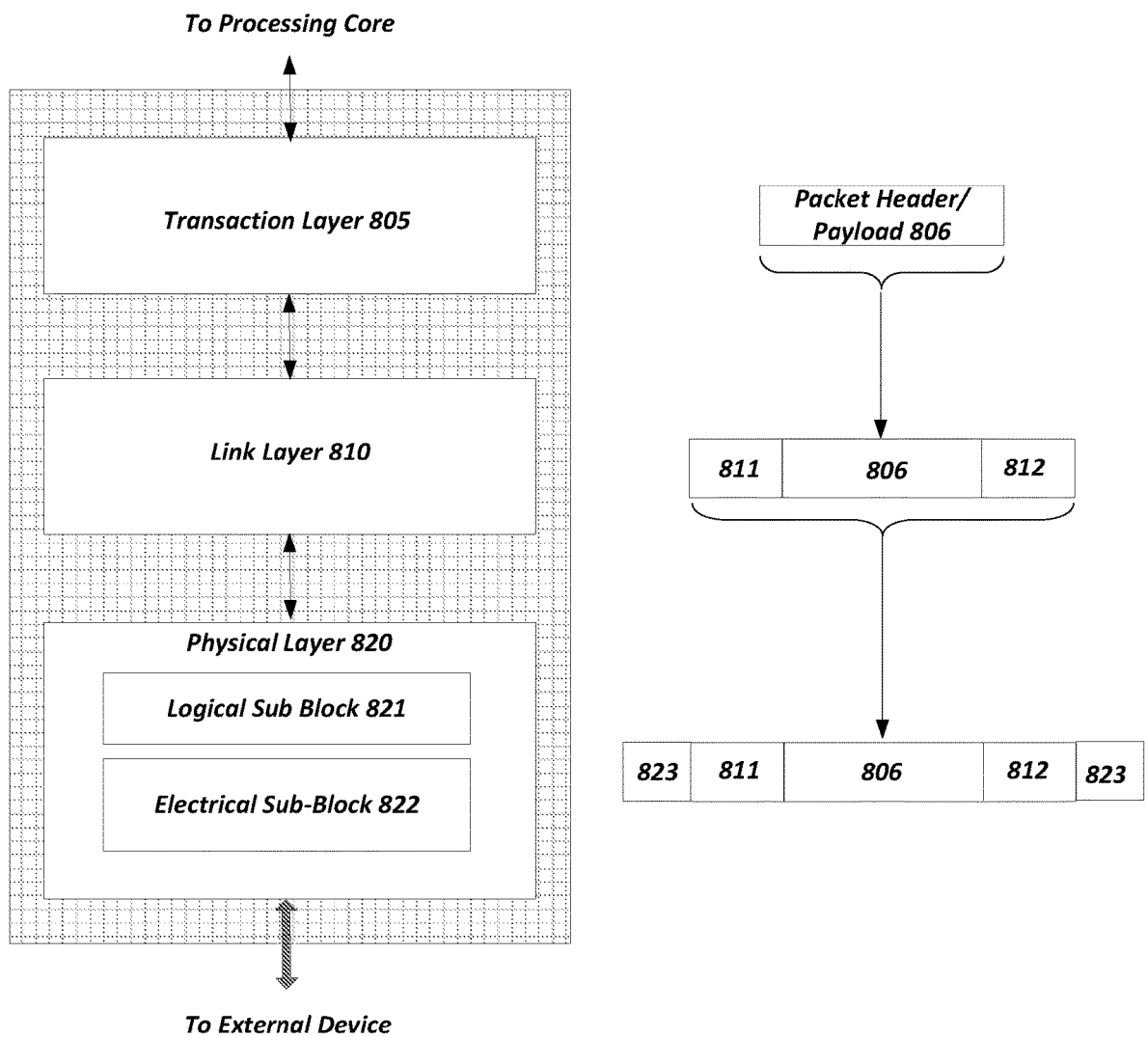
FIG. 8 illustrates an embodiment of an interconnect architecture including a layered stack.

Turning to FIG. 8 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 705 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 706. Format for current packet headers/payloads may be found in the PCIe specification at the PCIe specification website.

Figure 9:
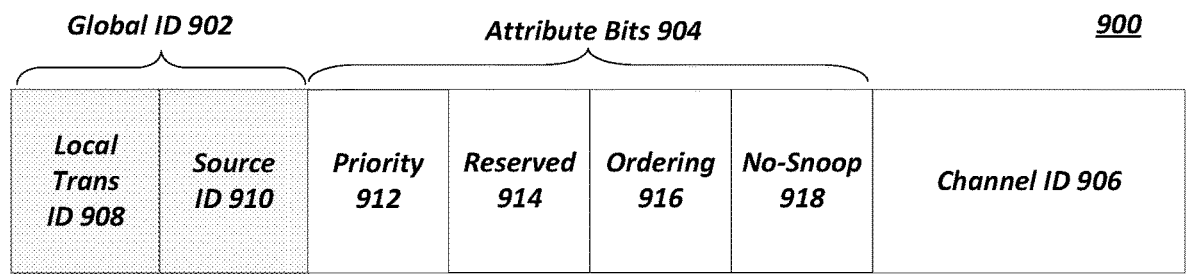
FIG. 9 illustrates an embodiment of a request or packet to be generated or received within an interconnect architecture.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904, and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
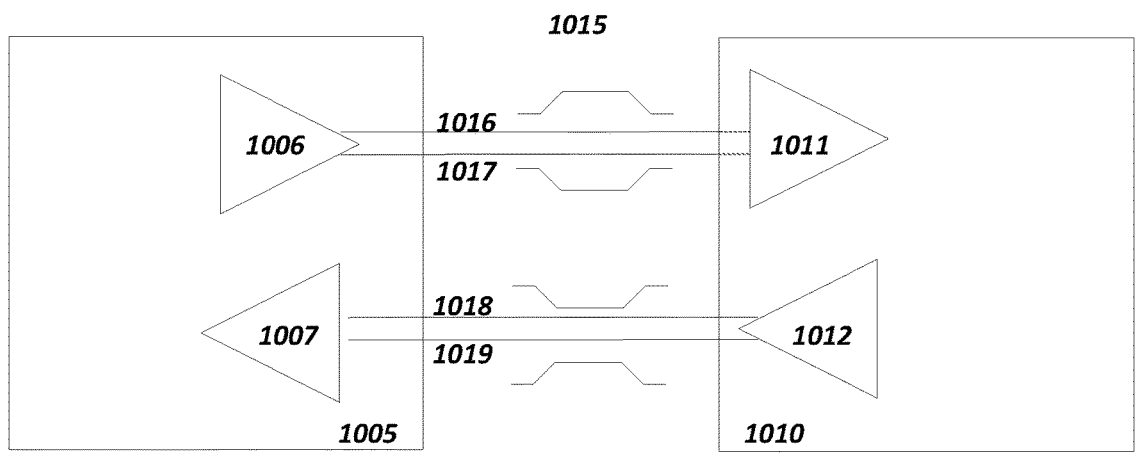
FIG. 10 illustrates an embodiment of a transmitter and receiver pair for an interconnect architecture.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 1015. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1016 and 1017, to transmit differential signals. As an example, when line 1016 toggles from a low voltage level to a high voltage level, i.e. a rising edge, line 1017 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 11:
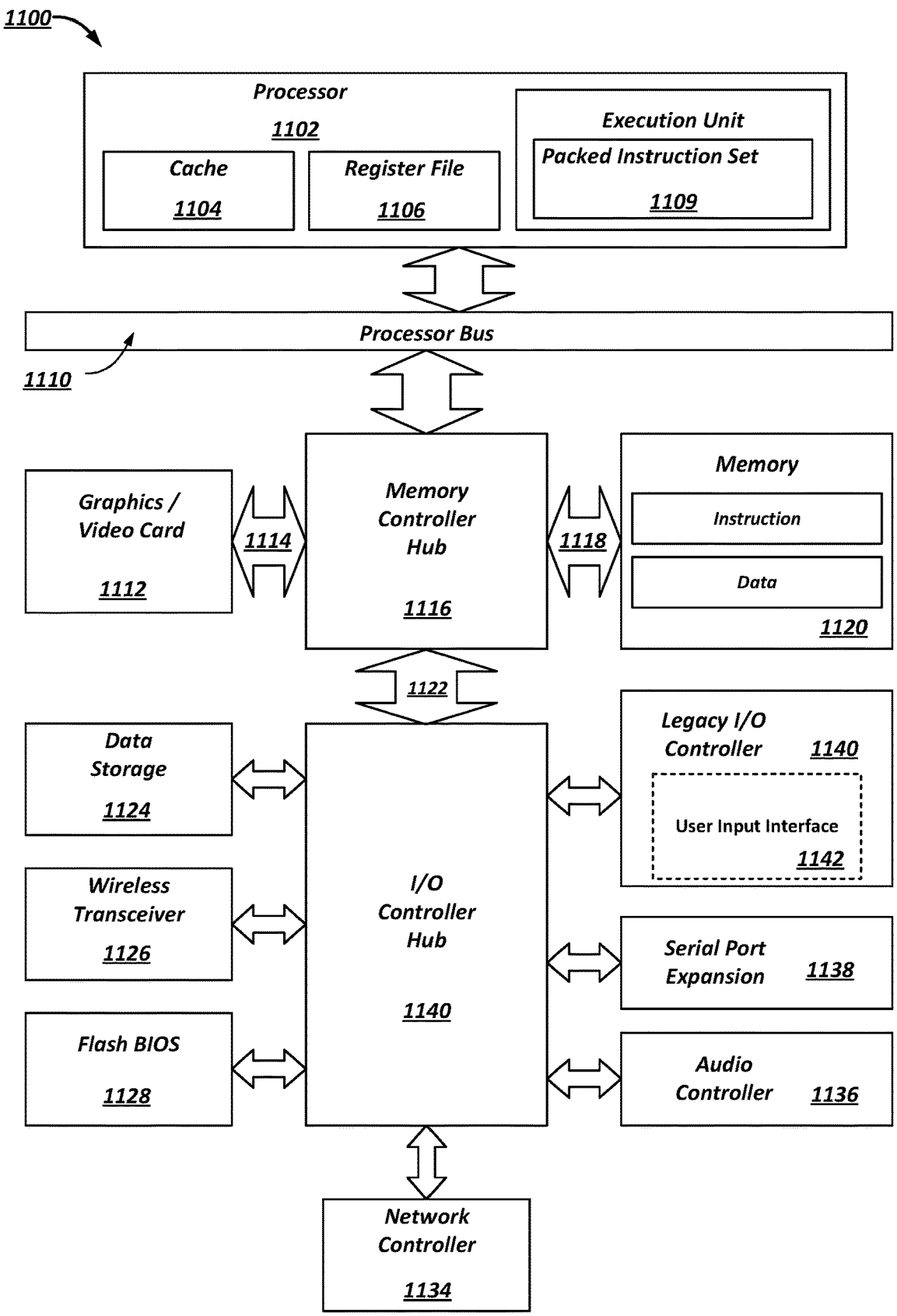
FIG. 11 illustrates another embodiment of a block diagram for a computing system including a processor.

Turning to FIG. 11, a block diagram of an exemplary computer system formed with a processor that includes execution units to execute an instruction, where one or more of the interconnects implement one or more features in accordance with one embodiment of the present disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4™, Xeon™ Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1008 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1124, wireless transceiver 1126, Flash BIOS 1028, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1020 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the disclosure may be utilized on one or more interconnect illustrated in FIG. 11. For example, an on-die interconnect (ODI), which is not shown, for coupling internal units of processor 1102 implements one or more aspects of the disclosure described above. Or the disclosure is associated with a processor bus 1110 (e.g. Intel Quick Path Interconnect (QPI) or other known high performance computing interconnect), a high bandwidth memory path 1118 to memory 1120, a point-to-point link to graphics accelerator 1112 (e.g.

a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

Figure 12:
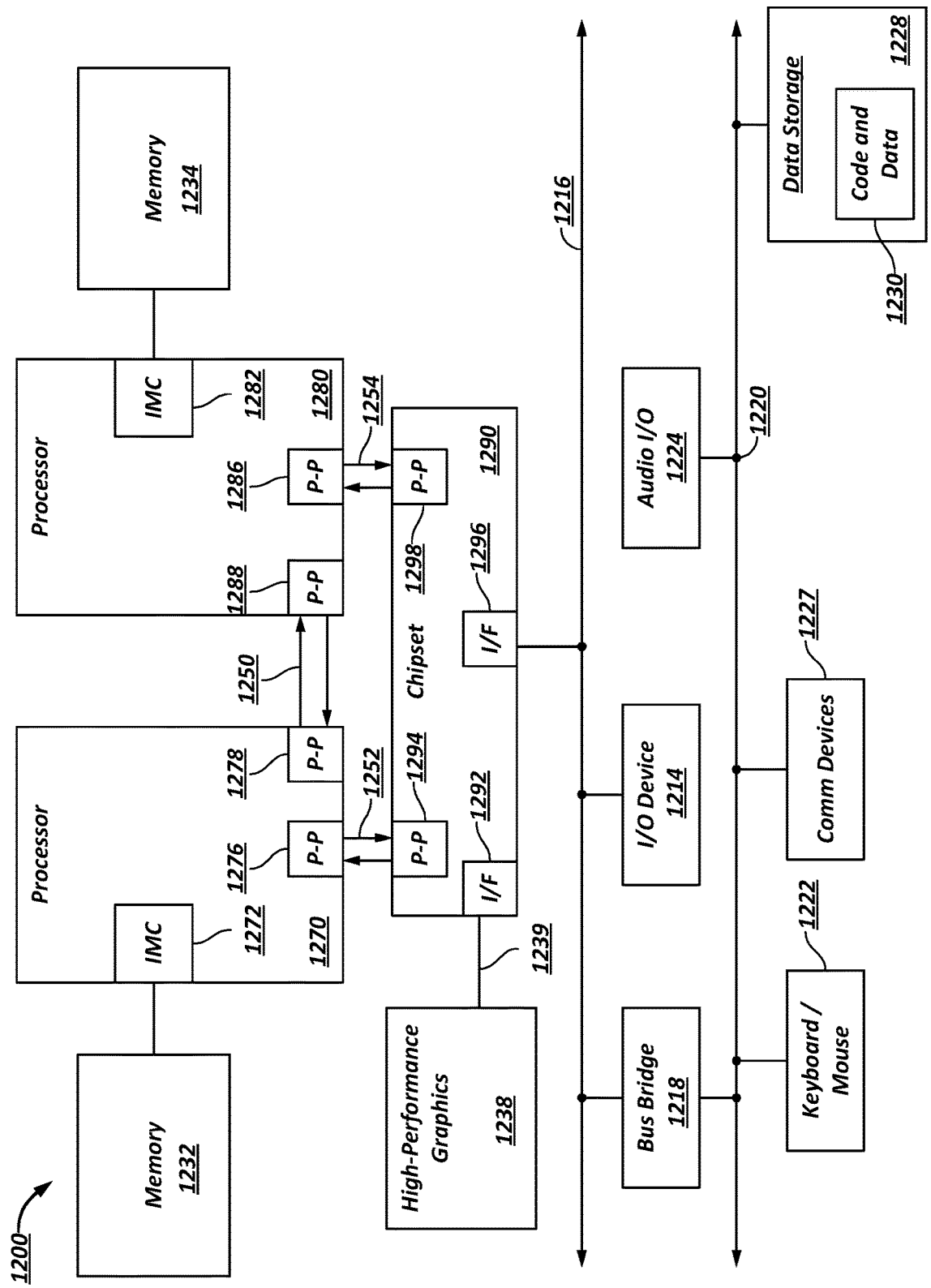
FIG. 12 illustrates an embodiment of a block for a computing system including multiple processor sockets.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1138 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Figure 13:
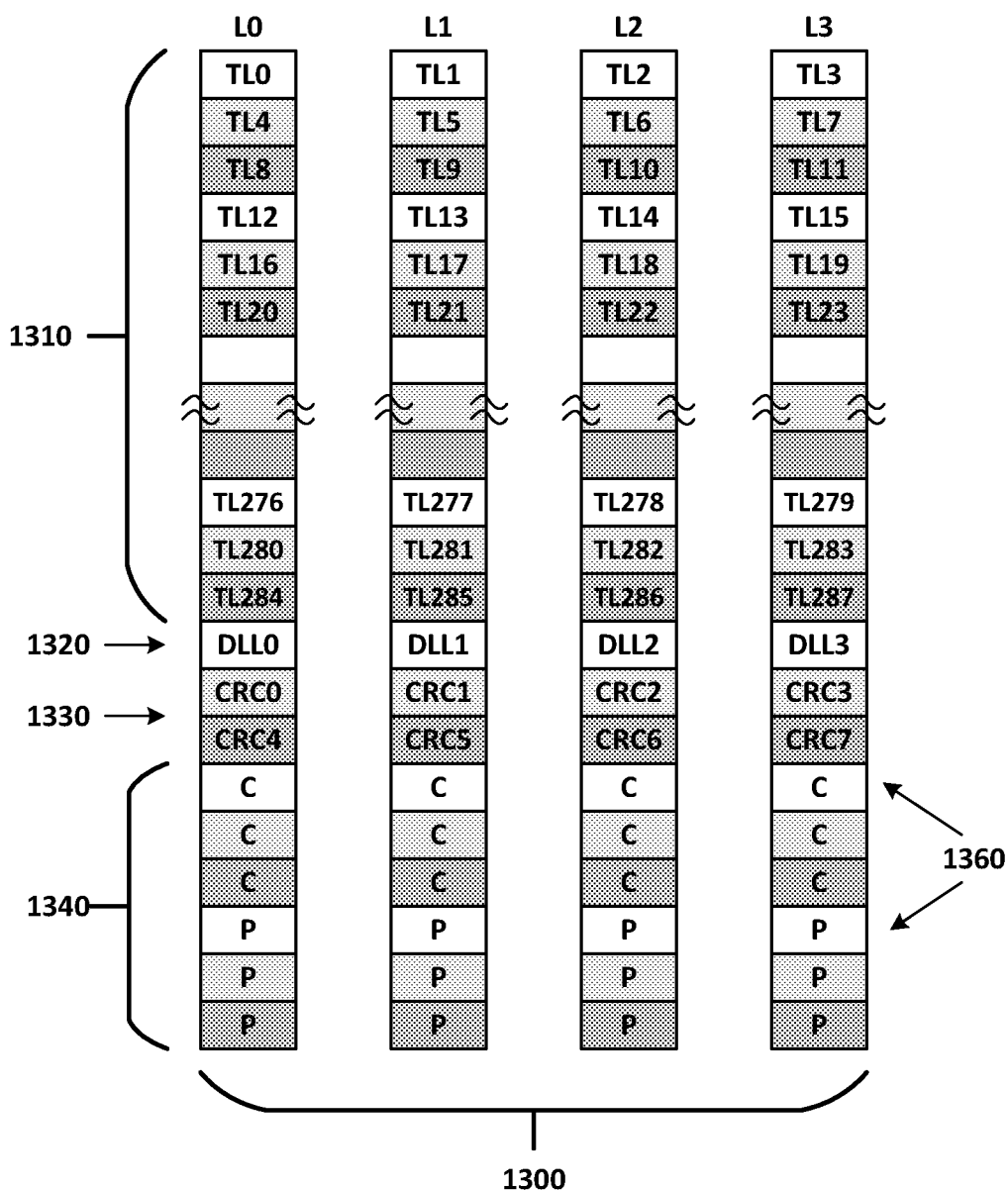
FIG. 13 illustrates an exemplary flit definition with a per-lane FEC scheme for a x4 PCIe link.

FIG. 13 illustrates an exemplary flit definition with a per-lane FEC scheme for a x4 PCIe link. A flit comprises one or more TLPs and DLLPs protected by a flit-level CRC scheme and a per-lane FEC scheme. In some embodiments, a flit may be protected by a flit-level FEC scheme, as will discussed in greater detail below. Flit 1300 comprises transaction layer packet symbols 1310, data link layer packet symbols 1320, flit-level CRC code symbols 1330, and FEC symbols 1340. Flit 1300 comprises 324 total symbols. In some embodiments, a symbol can be 1 DW in length, but a symbol can be different lengths in other embodiments. The 324 symbols in flit 1300 comprise 288 symbols carrying transaction layer packet information (TL0-TL287), 4 symbols carrying data link layer packet information (DLL0-3), 8 flit-level CRC symbols (CRC0-7), and 24 FEC symbols (12 check symbols (C) and 12 parity symbols (P)). Eight CRC symbols are used to ensure that multiple TL/DPP symbol errors are covered adequately. Information from a single TLP can span multiple TL symbols in a flit. For example, if a symbol is 1 DW long, flit 1350 would need 8 TL symbols to store a TLP that is 8 DWs in length.

Flit 1300 is transmitted across lanes 1350 (L0-L3). That is, a different portion of flit 1300 is sent across each of the four lanes. FIG. 13 shows successive TL, DLL, and CRC symbols being transmitted along adjacent lanes, but in other embodiments, symbols could be apportioned among lanes in differing fashions.

Flit 1300 can have a flit sequence number, which may be specified explicitly, implicitly, or opportunistically. If specified explicitly, the flit sequence number can be coded, for example, in reserved bits in the flit. If specified implicitly, the flit sequence number may not be sent across the link and a receiver can determine the flit packet number in another fashion, such as, for example, by counting flits as they are received. If specified opportunistically, the flit sequence number can be sent, for example, as payload in a DLLP packet that is sent in full or in part as part of a flit. In one example of flit sequence numbers being sent implicitly, the CRC can include the flit sequence number as, for example, consecutive bits in the CRC code during CRC computation. Accordingly, any dropped or replayed flits could be detected at a receiving end.

In flit 1300, four one-byte symbols (DLL0-3) are allocated for one DLLP. In other embodiments, information from multiple DLLPs can be carried in a single flit. In still other embodiments, a DLLP can be constructed over consecutive flits. For example, in a flit format that allocates five DLLP bytes, four DLLP bytes can carry one DLLP and the fifth DLLP byte from four consecutive flits can contribute to an additional DLLP.

The flit-level CRC code protects the flit contents minus the FEC check and parity symbols. For example, the flit-level CRC codes in symbols CRC0-7 in flit 1300 protect the TL, DLL and CRC symbols in flit 1300. The per-lane FEC scheme protects all symbols within a flit that are transmitted across one lane. For example, the six FEC check and parity symbols to be transmitted along one of the lanes L0-L3 protect the 81 symbols (324 flit symbols/4 lanes) transmitted along that lane. The FEC scheme further employs interleaving. The FEC scheme employed in flit 1300 uses three-way interleaving, as represented by the shading of each symbol. For example, check and parity symbols 1360, shown with no shading, protect the symbols transmitted along lane L3 that are also shown with no shading (TL3, TL7, TL11 ... TL287, CRC3, CRC7, check/parity symbols 1360). Thus, in the FEC scheme illustrated in FIG. 13, two FEC symbols—one check symbol and one parity symbol—are used to protect 27 flit symbols (81 symbols transmitted along lane L3/3-way interleaving). In other embodiments, alternative interleaving schemes (2-way, 4-way, etc.), as FEC schemes with more of fewer check and parity bits per lane can be used to achieve a desirable bit error rate.

Figure 14:
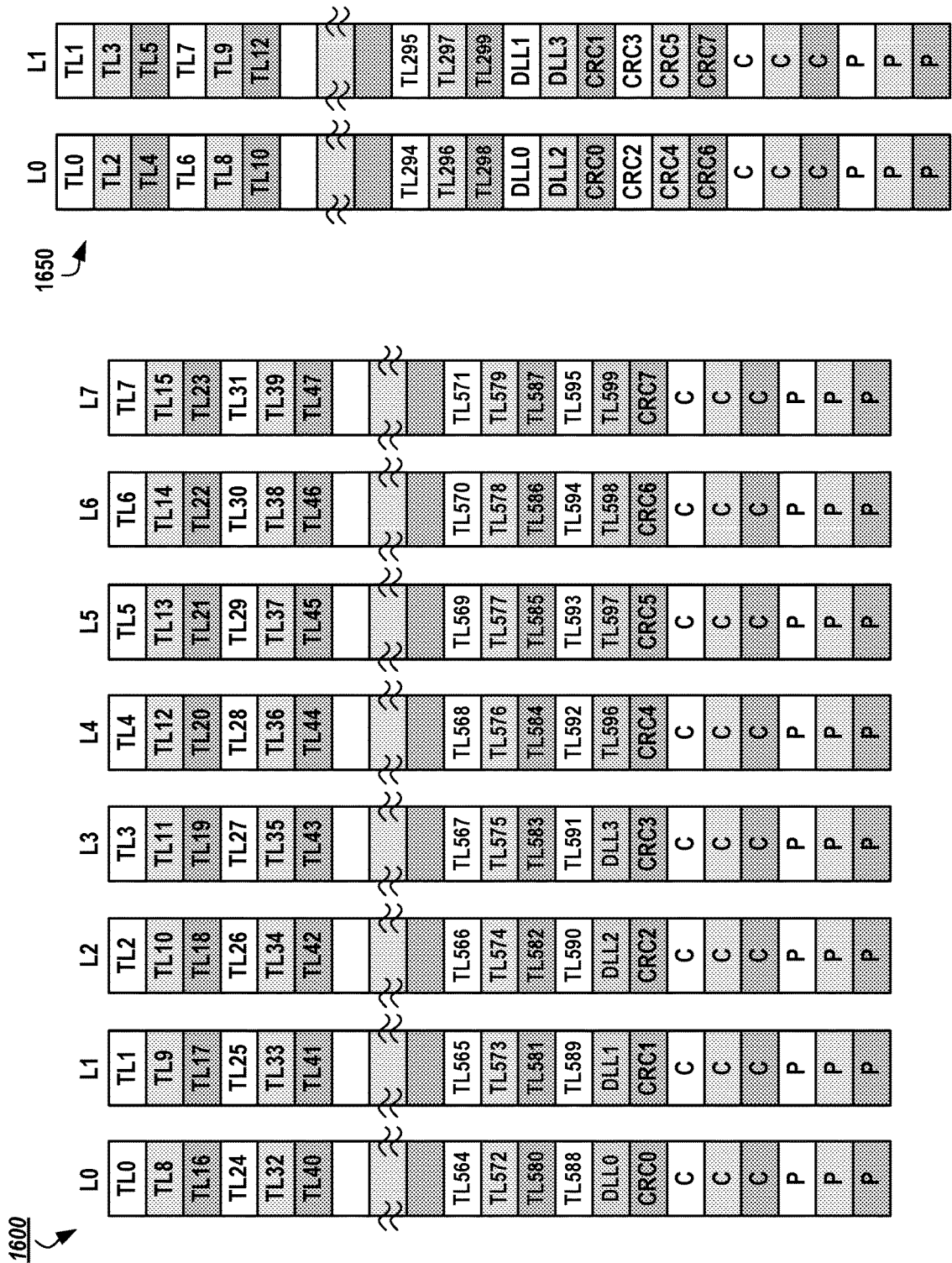
FIG. 14 illustrates exemplary flit definitions with a per-lane FEC scheme for x8 and x2 PCIe links.

Different flit definitions can be used for different link widths. FIG. 14 illustrates exemplary flit definitions with per-lane FEC schemes for x8 and x2 PCIe links. Flit 1400 defines a 648-symbol flit format for a PCIe x8 link. Flit 1400 comprises 1400 symbols containing transaction layer packet data (TL0-TL599), 4 symbols containing data link layer packet data (DLL0-3), 8 flit-level CRC symbols (CRC0-7), and 48 FEC symbols (24 check symbols and 24 parity symbols). The 648 symbols are transmitted across eight lanes (L0-L7). As in flit 1300, the six FEC check and parity symbols transmitted in a lane protect 81 symbols (648 symbols/8 lanes) using 3-way interleaving, with each pair of FEC check and parity symbols protecting 27 symbols (81 symbols/3-way interleaving).

Flit 1450 is a 324-symbol flit definition for a PCIe x2 link. Flit 1450 comprises 300 symbols carrying transaction layer packet information (TL0-TL299), 4 symbols carrying data link layer packet information (DLL0-3), eight CRC symbols (CRC0-7), and 12 FEC symbols (6 check symbols and 6 parity symbols). The 324 symbols are transmitted across two lanes (L0-L1). The six FEC check and parity symbols transmitted in each lane protect 162 symbols (324 symbols/2 lanes) using three-way interleaving, with each pair of FEC check and parity symbols protecting 54 symbols (162 symbols/3-way interleaving).

Flits 1300, 1400 and 1450 show exemplary flit definitions for particular PCIe link widths. Other flit definitions are possible for a particular PCIe link. The number of TL and/or DLL symbols can vary from one flit definition to another, as can the number flit-level CRC symbols used to protect a flit, the number of FEC symbols used to protect a lane, and the degree of interleaving used for the FEC scheme. Increasing the number of flit-level CRC symbols and/or the FEC symbols used can reduce BER, but at the cost of increased overhead, and thus, efficiency.

In some embodiments, the flit definition for a particular link can be defined, determined, or supplied by an operating system or BIOS during system start-up. The flit definition for a link can be stored in software or firmware local to the system, be encoded in hardware, or stored remotely and accessed during system start-up. The flit definition for a particular link need not be static and can vary during system operation. For example, the physical layer, protocol stack, or operating system can receive an updated flit definition for a particular link and the link can begin using the updated flit definition at some point after receiving the updated flit definition. An updated flit definition can be provided in response to various events. For example, a physical layer can monitor link performance and signal to the protocol stack or operating system that the BER of the link is too high, and the system can switch to a flit definition that has a flit-level CRC scheme with more CRC bytes, a per-lane FEC scheme that has more check and parity bits per lane, a flit-level FEC scheme that has more check and parity bits per flit, or a combination thereof. In another example, the system can determine that greater information throughput is possible while keeping the BER at an acceptable level and a flit definition providing greater transmission efficiency can be used. Greater efficiency can be obtained in an updated flit definition by increasing the number of TLP/DLLP packet symbols in the flit, or by reducing the number of flit-level CRC symbols and/or the number of FEC check/parity symbols.

FIG. 15 shows a table of flit characteristics for exemplary flit definitions with per-lane FEC schemes for various PCIe link widths. Table 1500 shows flit characteristics for flits 1300, 1400, and 1450 for x4, x8 and x2 links, respectively, and flit characteristics for possible flit definitions for x1 and x16 links. The FEC latencies shown are approximate latency times at transfer speeds proposed for PCIe Gen 6. The narrower links (x1, x2) have higher FEC latency to derive better efficiency by amortizing the fixed overhead (flit-level CRC symbols and data link layer packet information) as shown. Different flit sizes for a given link width can be selected to trade-off latency for efficiency.

Flit-based packetization can provide at least the following advantages. First, flit-based packetization removes the need for a LCRC to be attached to each TLP since the flit is protected by a CRC scheme at the flit level. Flit 1300 in FIG. 13 comprises TLP data from 288 TLPs and only eight flit-level CRC symbols. If sent across a link using current PCIe protocols, those 288 TLPs would be accompanied by 288 LCRCs. In other words, a flit does not contain a CRC sent along with each TLP included in the flit. With flit-based packetization, link layer retry happens at the flit level. In one embodiment, a failed flit can be retried with a receiver storing successfully transmitted flits received at the receiver after the corrupted or missing flit. In some embodiments, a transmitter can be informed that a transmitted flit was not successfully received through receipt of a NAK DLLP containing the sequence number of the flit to be resent. In some embodiments, a retried flit can indicate that it is being resent via a "retry flit" encoding in the corresponding DLLP along with the sequence number of the retried flit.

Second, flit-based packetization allows for the adoption of guaranteed DLLP frequency policies. In one embodiment, upon transmission of a flit, the transmitter is to receive a DLLP acknowledgment packet indicating that the flit was received no later than n flits after being sent. In another embodiment, a receiver is to send a DLLP packet providing credit updates to the transmitter no later than m flits after accruing x number of credits. Such policies can reduce storage overhead at the receiver relative to current receiver storage needs, which account for current PCIe DLLP scheduling policies and having to handle such situations as sending an ACK or NAK DLLP behind a maximum payload size TLP.

Third, since flit definitions provide guaranteed positions for DLLPs in a flit, the 2-5% variable bandwidth loss due to DLLP scheduling is exchanged for a fixed bandwidth reduction for a given flit definition. For example, in the x4 flit definition of flit 1300, the bandwidth reduction due to DLLP overhead is only 1.2% (1/81).

Fourth, the bandwidth loss due to the addition of framing information added by the physical layer to each TLP is eliminated since transaction layer packet information is in fixed locations in the flit and flit boundaries are known. That is, physical layer framing information is not added to a TLP for every TLP transmitted as part of a flit.

Fifth, because a particular flit format has a defined length, the synchronization header that is periodically sent in current PCIe protocols can be replaced by a periodic ordered set (OS), such as a SKP OS (Skip Ordered Set), EIOS (Electrical Idle Ordered Set), or EIEOS (Electrical Idle Exit Ordered Set). In one embodiment, a periodic OS can be sent every 72 flits for flits that are 10.25 ns long where there is a 600-ppm clock spread. Replacing the synchronization header with a periodic OS can reclaim at least a portion of the bandwidth consumed through use of a synchronization header. In current PCIe protocol formats, synchronization headers consume approximately 1.5% of bandwidth.

Figure 16A:
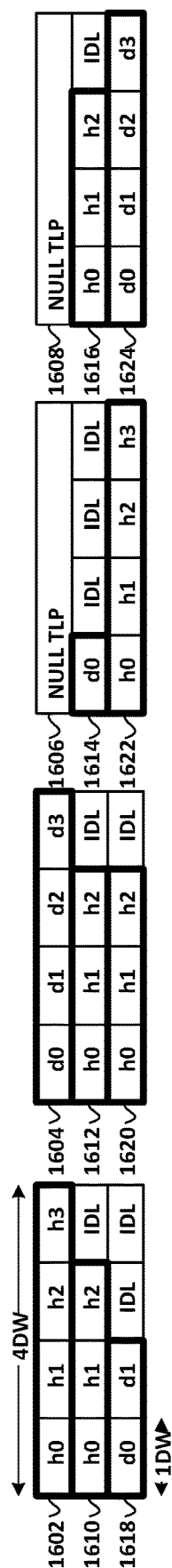
FIGS. 16A-16C illustrate exemplary flit packet sequences according to various placement rules.
Figure 16B:
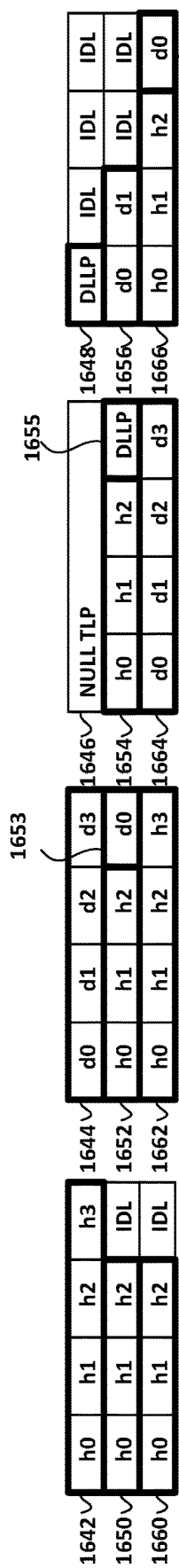
Figure 16C:
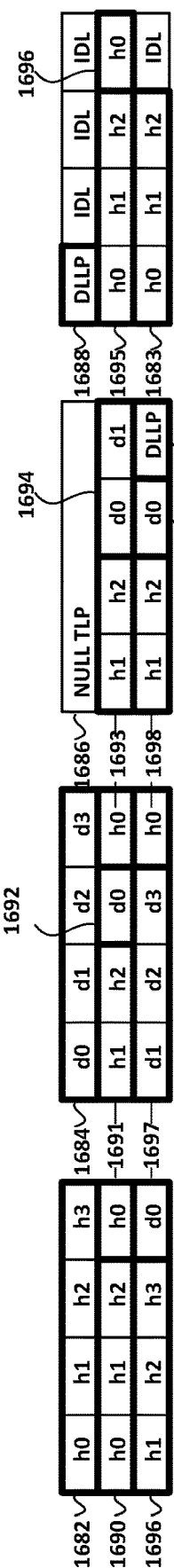

FIGS. 16A-16C illustrate exemplary flit packet sequences according to various placement rules. A flit definition defines which slots or fields in the flit may be occupied by TLP or DLLP information, but, in some embodiments, placement or packing rules are used to determine where TLP or DLLP information for individual TLPs/DLLPs to be sent in a flit are placed. FIGS. 16A-16C show a sequence of 48 flit packets transmitted across a link. The packets are sent in order from left to right in each row, with the first row being sent first and the third row being sent last. Each column is 1 DW wide and each set of four columns is 4 DW wide.

FIG. 16A illustrates TLPs placed in a flit according to the rule that only TLP header information or TLP payload (data) information can reside in each aligned 4 DW set. Starting with the upper left-most packet, the first two 4 DW sets contain header information 1602 (h0-h3) and payload information 1604 (d0-d3) of a first TLP. The next two 4 DW sets contain NULL TLPs 1606 and 1608. The first 4 DW set in the second row contains header information 1610 (h0-h2) for a second header-only TLP. Because the header of this second TLP is only 3 DWs wide, the fourth DW set is filled with an IDL packet. Idle packets can be used to fill in 4 DW sets where the header or payload information for a packet is less than four DWs in length. Continuing along the second row, the second and third 4 DW sets contain header information 1612 (h0-h2) and payload information 1614 (d0) for a third TLP. Because the header and payload information for this third TLP is less than 4 DWs, the second and third 4 DW sets are filled with IDL packets. The fourth 4 DW set in the second row is filled with header information 1616 (h0-h2) for a fourth TLP, and an idle packet. The payload 1618 (d0-d1) for the fourth TLP is placed in the first two DWs of the third row, followed by two idle packets. The remaining three 4 DW sets in the third row comprise header information 1620 (h0-h2) for a fifth TLP, and header information 1622 (h0-h3) and payload information 1624 (d0-d3) for a sixth TLP. In sum, six TLPs are packed into the 48 DWs illustrated in FIG. 16A.

FIG. 16B illustrates TLPs and DLLPs placed in a flit according to the rule that each aligned 4 DW set can contain header and data information from one TLP, with DLLPs placed opportunistically. Starting with the upper left-most packet of FIG. 16B, the first two 4 DW sets contain header information 1642 (h0-h3) and payload information 1644 (d0-d3) of a first TLP. The third 4 DW set contains NULL TLP 1646 and the fourth 4 DW set contains a first DLLP 1648 followed by three IDL packets. Moving to the second row, the first 4 DW set contains header information 1650 (h0-h2) for a second TLP, followed by an IDL packet. The second DW contains header information 1652 (h0-h2) and payload information 1653 (d0) for a third TLP. The first three DWs in the third 4 DW set in the second row is filled with header information 1654 (h0-h2) for a fourth TLP and an opportunistically placed second DLLP 1655. The fourth DW set in the second row contains payload information 1656 (d0-d1) for the fourth TLP, with the last two DWs containing idle packets. Continuing to the last row, the first 4 DW set contains header information 1660 (h0-h2) for a fifth TLP and an idle packet. The second and third 4 DW sets contain header information 1662 (h0-h3) and payload information 1664 (d0-d3) for a sixth TLP. The last 4 DW set comprises header information 1666 (h0-h2) and payload information 1667 (d0) for a seventh TLP. The first six TLPs placed in FIG. 16B are the same TLPs placed in FIG. 16A. The looser packing rules associated with FIG. 16B allow for a seventh TLP and two DLLPs to be additionally placed in the same 48 DWs.

FIG. 16C illustrates TLPs and DLLPs placed in a flit according to the rule that TLP header and payload information can be placed at any DW boundary, with opportunistic DLLP placement. Placing the same 7 TLPs and 2 DLLPs that were placed in FIG. 16B, the first TLP and the first DLLP are placed in the first row of FIG. 16C in the same manner as they were in FIG. 16B. Moving to the second row, the first 4 DW set contains information from the second and third TLPs: header 1690 (h0-h2) from the second TLP and the first DW (h0) of header information 1691 (h0-h2) of the third TLP. The remaining header information (h1-h2) of the third TLP is placed in the first two DWs of the second 4 DW set. Header information 1693 (h0-h2) for a fourth DLP is contained in the last DW of the second 4 DW set and the first two DWs of the third 4 DW set. The payload information 1694 (d0-d1) of the fourth TLP is placed in the second half of the third 4 DW set. The last 4 DW set of the second row contains header information 1695 (h0-h2) of the fifth TLP. The header information 1696 (h0-h3) of the sixth DLP fills the last DW of the second row and continues into the first three DWs of the first 4 DW set of the third row. The payload information 1697 (d0-d3) of the sixth TLP fills the last DW of the first 4 DW set in the third row and the first three DWs of the second 4 DW set. The remainder of the last row is filled with the header information 1698 (h0-h2) and payload information 1699 (d0) of the seventh TLP, a second DLLP 1681 and header information 1683 (h0-h2) of an eighth TLP. Allowing TLP header and payload data to be placed in any DW allows for the seven TLPs and 2 DLLPs placed in FIG. 16B to be placed more compactly—they fit in five fewer DWs and allow for placement of an eighth TLP.

FIG. 17 shows a table of PCIe 5.0 TLP efficiencies. Table 1700 shows how TLP efficiency under the most current version of the PCIe protocol varies with transaction size, yielding efficiencies above 90% for large payloads but dropping down to 62.7% for header-only transactions. These efficiencies are the same regardless of link width. Table 1500 in FIG. 15 shows flit-based packetization achieving TLP efficiencies ranging from 88.9%-94.4% across link widths, a relatively uniform efficiency as compared to the range of TLP efficiencies in PCIe 5.0 across transaction sizes.

Figure 18A:
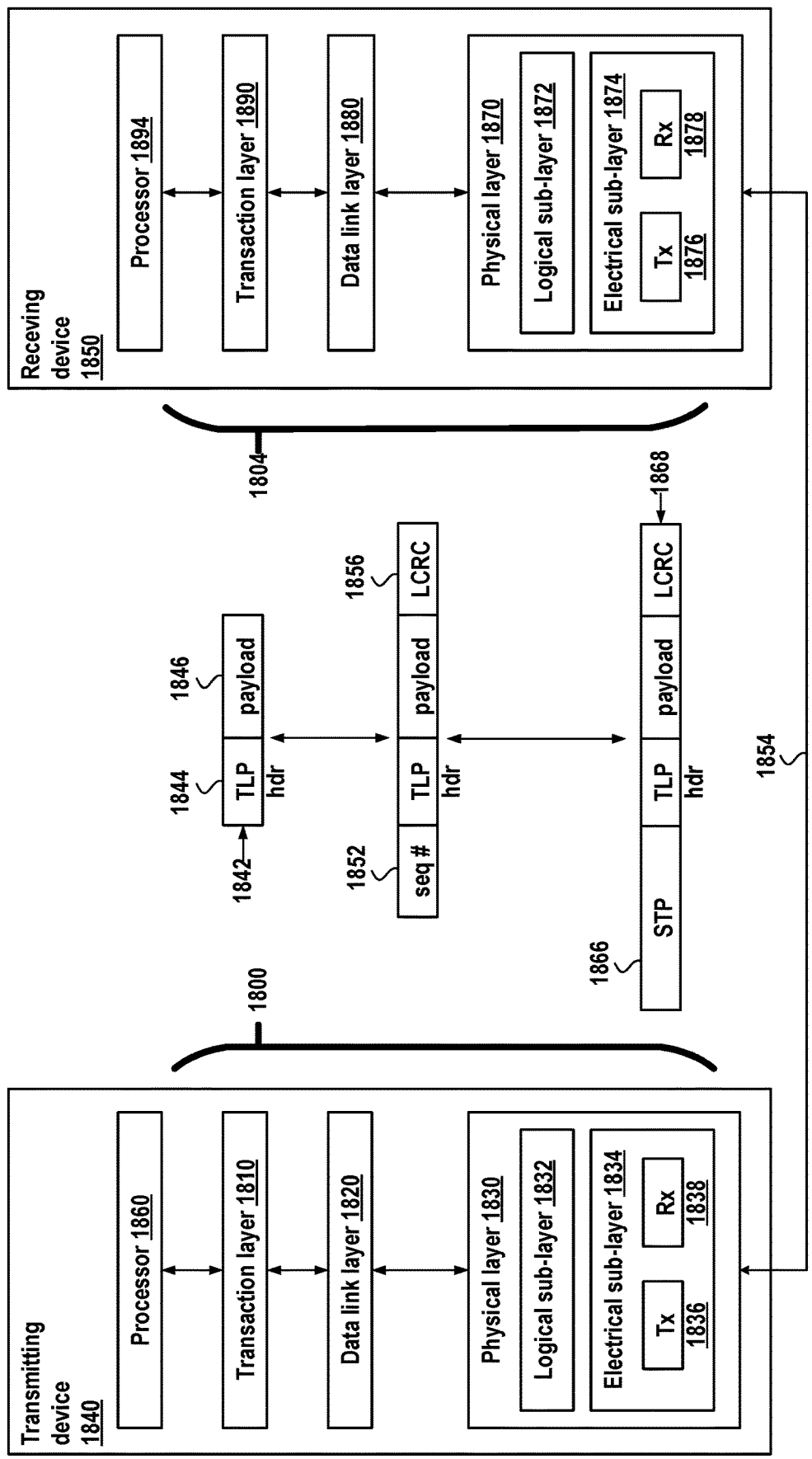
FIG. 18A is a schematic diagram of an example pair of protocol stacks implemented in a transmitting-receiving device pair in accordance with embodiments of the present disclosure.

FIG. 18A illustrates an exemplary pair of protocol stacks implemented in a transmitting-receiving device pair. Protocol stacks 1800 and 1804 can be any kind of protocol or network stack, such as a PCIe stack. Although references are made herein to a PCIe stack, the same concepts may be applied to other protocol or network stacks. In one embodiment, protocol stack 1800 is a PCIe protocol stack comprising transaction layer 1810, data link layer 1820, and physical layer 1830. A communication port may be referred to as a module, circuitry, interface, or port implementing or including protocol stack 1800 or any other protocol stack. Thus, in one embodiment, a protocol stack can comprise a transaction layer module, a data link layer module and a physical layer module. Such a protocol stack can also be considered as comprising transaction layer circuitry, data link layer circuitry, and physical layer circuitry. When referencing the protocol stack as a whole, a protocol stack can be referred to as protocol stack circuitry or a protocol stack module.

PCI Express uses packets to communicate information between a root complex, switches, and endpoints. For example, information to be sent from transmitting device 1840 to receiving device 1850 is sent from processor 1860 (or any other processing device of transmitting device 1840) to protocol stack 1800. Transaction layer 1810 packets carry the information to be delivered from processor 1860 of transmitting device 1840 to processor 1894 of receiving device 1850. As the packets that are formed at transaction layer 1810 move down the protocol stack to data link layer 1820 and then to physical layer 1830, they are extended with information to handle packets at those layers. Physical layer 1830 of transmitting device 1840 transmits packets over link 1854 to physical layer 1870 of receiving device 1850. There, the reverse process occurs, and the information added to the packets as they moved down protocol stack 1800 are stripped as they move up protocol stack 1804. Transaction layer 1890 of protocol stack 1874 delivers the payload of the packets sent from transmitting device 1840 to processor 1894 of receiving device 1850, thus resulting a message being sent from transmitting device 1840 to receiving device 1850.

In one embodiment, transaction layer 1810 provides an interface for processor 1860 to PCIe protocol stock 1800. Transaction layer 1810 is responsible for the assembly and disassembly of transaction layer packets (TLPs) that deliver information between devices. Upon receipt of information from processor 1860, transaction layer 1810 assembles one or more TLP packets that will deliver the information to receiving device 1850. TLP packet 1842 is one embodiment of a TLP packet. TLP packet 1842 comprises TLP header 1844 and payload 1846. Additional information can be included in a TLP packet, such as an end-to-end cyclic redundancy code (ECRC), an error-detection code that a PCIe transaction layer can calculate for a TLP packet.

Data link layer 1820 acts as an intermediate stage between transaction layer 1810 and physical layer 1830. In one embodiment, one responsibility of data link layer 1820 is to provide a reliable mechanism for exchanging Transaction Layer Packets (TLPs) between devices across a link. In one embodiment, the reliability mechanism is implemented in part by determining a packet sequence number for a TLP packet and calculating a link CRC (LCRC) value based on the contents of the TLP packet and the packet's sequence number. Data link layer 1820 appends information 1852 to the head of TLP packet 1842 that includes the packet sequence number and appends LCRC value 1856 to the tail of TLP packet 1842. Data link layer 1820 submits TLP 1842 with appended information to physical layer 1830 for transmission across link 1854 to receiving device 1850.

Moving down the protocol stack 1800 of transmitting device 1840, in one embodiment, physical layer 1830 includes logical sub-layer 1832 and electrical sub-layer 1834 to physically transmit a packet to an external device. Here, logical sub-layer 1832 is responsible for the "digital" functions of physical layer 1830. In this regard, the logical sub-layer includes a transmit section to prepare outgoing information for transmission by physical sub-layer 1834, and a receive section to identify and prepare received information before passing it to data link layer 1820. Logical sub-layer 1832 frames the appended TLP packet with start transaction packet (STP) field 1866 to generate an as-transmitted TLP 1868 that is transmitted across link 1854. The STP field 1866 comprises sequence number 1852, frame CRC bits, the length of the TLP, and other information.

As used herein, the term "transaction layer packet" refers to TLPs generated by transaction layer 1810 and comprises TLP header and payload information. The terms "transaction layer packet information" and "transaction layer packet data" can refer to either the TLP header, the TLP payload, or both. As used herein, the term "transaction layer packet" does not include information added to a TLP, such as sequence number, LCRC, or framing data added by the data link and physical layers, unless expressly stated. Similarly, the term "data link layer packet" refers to data link layer packets that do not contain framing data added by a physical layer, unless expressly stated.

Electrical sub-layer 1834 includes transmitter 1836 and receiver 1838. Transmitter 1836 is supplied symbols by logical sub-layer 1832, which transmitter 1836 serializes and transmits to receiving device 1850 across link 1854. Receiver 1838 is supplied with received serialized symbols sent across link 1854 by receiving device 1850 and transforms the received signals into a bitstream. The bitstream is deserialized and supplied to logical sub-layer 1832. In one embodiment, packets are transmitted across link 1854 using an 8b/10b data encoding scheme, wherein eight bits of data are transmitted as ten-bit symbols.

Although transaction layer 1810, data link layer 1820, and physical layer 1830 are discussed in reference to an embodiment of a PCIe protocol stack, a protocol stack is not so limited. In other embodiments, protocol stack 1800 can have different layers and/or fewer or more layers than those shown. Further, in other embodiments, the separate layers shown in FIG. 18A can be combined into a single layer, and a single layer as shown in FIG. 18A can be split into multiple layers. Any of the layers in the protocol stack shown in FIG. 18A can be implemented as part of the operating system of a computing device, one or more software applications independent of the operating system, or operate at another software layer. The layers shown in FIG. 18A can be implemented in software, hardware, firmware or combinations thereof and can be alternately referred to as modules or circuitry (e.g., "data link layer module," "physical layer circuitry") or a combination thereof. A computer device referred to as being programmed to perform a method can be programmed to perform the method via software, hardware, firmware or combinations thereof.

The Physical Layer can originate physical layer packets (PLP) from a transmitter device and terminates at the Physical Layer of a receiver device. PLPs can include EIOS, EIEOS, SKP OS, and other ordered sets.

Figure 18B:
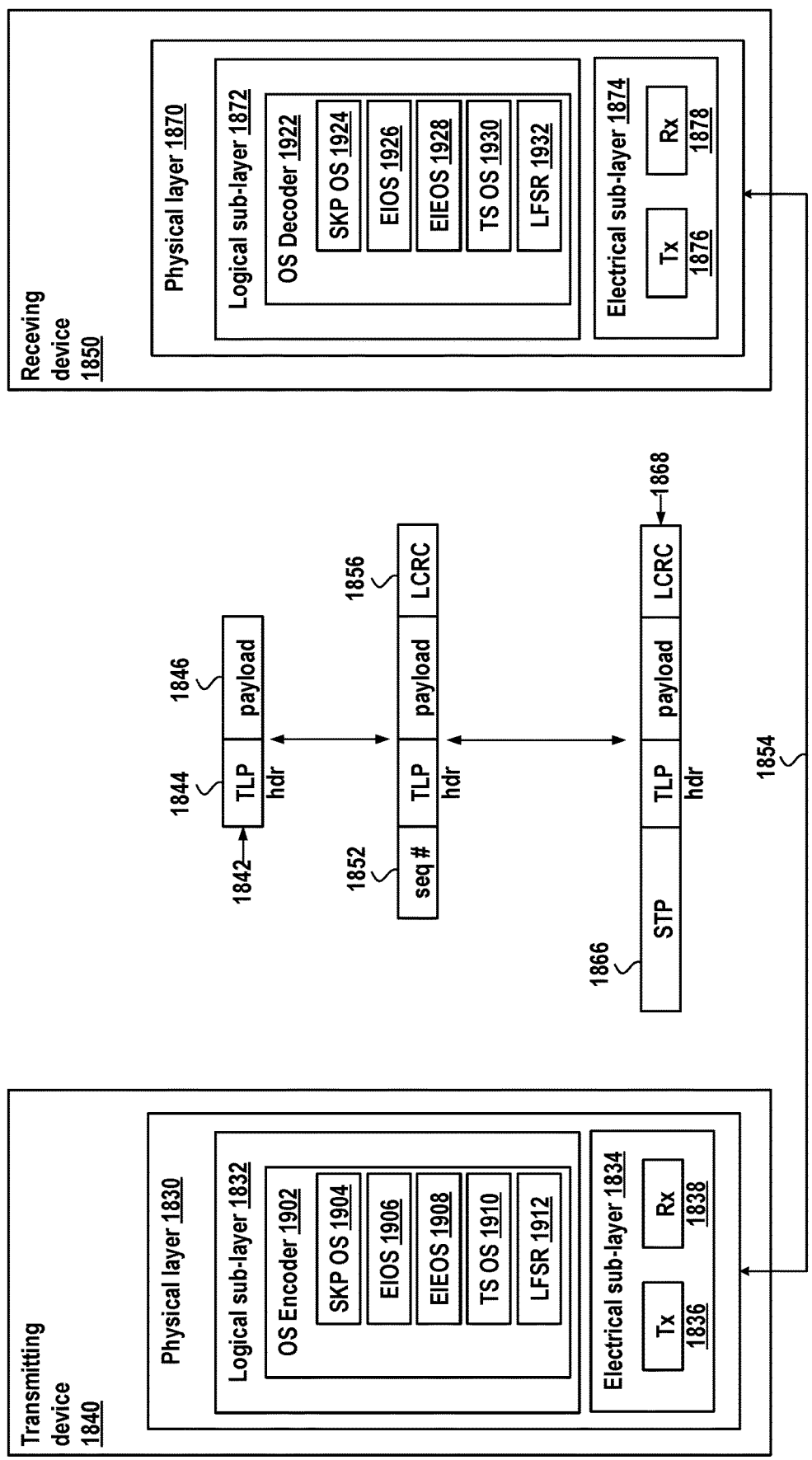
FIG. 18B is a schematic diagram of an example logical PHY that includes logical elements for encoding and decoding ordered sets in accordance with embodiments of the present disclosure.

FIG. 18B is a schematic diagram of an example PHY 1830 and 1970 that includes logical elements for encoding and decoding ordered sets in accordance with embodiments of the present disclosure. Physical layer 1830 can include a logical sub-layer 1832 that includes an ordered set encoder logic 1902. Ordered set encoder logic 1902 can include electrical circuitry, state machines, and/or other logic to encode packets with ordered sets, as described above. The ordered set encoder logic 1902 can include a common logic, circuitry, state machine, etc. for encoding the various types of ordered sets. In some embodiments, each type of OS can be encoded using a corresponding encoding logic. For example, SKP OS can be encoded using SKP OS encoding logic 1904, EIOS can be encoded using EIOS OS encoding logic 1906, EIEOS can be encoded using EIEOS encoding logic 1908, training symbol OS can be encoded using TSOS 1910, etc.

Data blocks can be encoded with SKP ordered sets, EIOS, EIEOS, training (TS1/TS2) ordered sets, SKP end ordered sets, or other types of ordered sets. The OS encoding logic 1912 can encode any type of OS into a data block, in which case a common state machine can be used by to perform the encoding of the data block. In some embodiments, each type of OS can be encoded by a corresponding encoding logic, e.g., making use of a unique state machine. A combination of a common encoder and specific OS encoder can also be used.

The OS encoding logic 1902 can also include a shift register, such as linear-function shift register (LFSR) 1912. The LFSR 1912 can be embodied using logic circuitry, such as circuitry that includes exclusive or (XOR) gates or other circuitry. The LFSR 1912 can be used to check bits after encoding the packet and prior to sending the encoded bits out to the PHY.

The receiving device 1850 can include a physical layer 1870 that also includes a logical sublayer 1872. Logical sublayer 1872 includes an OS decoder logic 1922. OS decoder logic 1922 can decode OS bits from a received packet. The OS decoder 1922 can include a common state machine (and/or other logic) for decoding the OS bits from the received packet. In some embodiments, each type of OS can be decoded by a corresponding decoder logic. For example, SKP OS can be decoded using SKP OS decoding logic 1924, EIOS can be decoded using EIOS OS decoding logic 1926, EIEOS can be decoded using EIEOS decoding logic 1928, training symbol OS can be decoded using TSOS 1930, etc.

The OS decoding logic 1922 can also include a shift register, such as linear-function shift register (LFSR) 1932. The LFSR 1932 can be embodied using logic circuitry, such as circuitry that includes exclusive or (XOR) gates or other circuitry. LFSR 1932 can be used to check the OS bits received in a packet against expected bits for transmission errors. For example, when checking that 5 out of 8 SKP OS bits are accurate against the expected bits during a certain interval, the LFSR 1932 can be used to determine whether bit errors have occurred in the received packet.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example 1 is an apparatus comprising a port for transmitting data; and a link coupled to the port. The port comprising a physical layer device (PHY) to decode a physical layer packet, the physical layer packet received across the link, the physical layer packet including a first bit sequence corresponding to a first ordered set, and a second bit sequence corresponding to a second ordered set, the first bit sequence immediately adjacent to the second bit sequence.

Example 2 may include the subject matter of example 1, wherein the first ordered set is received at a predetermined ordered set interval.

Example 3 may include the subject matter of example 2, wherein the predetermined ordered set interval occurs following a flow control unit (flit).

Example 4 may include the subject matter of example 3, wherein the predetermined ordered set interval occurs between two flits.

Example 5 may include the subject matter of any of examples 1-4, wherein the first ordered set comprises eight bytes and the second ordered set comprises eight bytes.

Example 6 may include the subject matter of example 5, the port to read the eight bytes of the first ordered set; and check that five of the eight bytes match an expected type of ordered set.

Example 7 may include the subject matter of any of examples 1-6, the port to determine that five of the eight bytes do not match an expected type of ordered set; and enter a link recovery state.

Example 8 may include the subject matter of any of examples 1-6, the port to determine that five of the eight bytes match an electrical idle ordered set (EIOS); and enter a low power state after the second ordered set.

Example 9 may include the subject matter of any of examples 1-6, the port to determine that five of the eight bytes match an electrical idle exit ordered set (EIEOS); and enter a link recovery state after the second ordered set.

Example 10 may include the subject matter of any of examples 1-6, the port to determine that five of the eight bytes match a skip ordered set (SKP OS); read the second ordered set; and determine an ordered set type from the second ordered set.

Example 11 may include the subject matter of example 10, the port to determine that the second ordered set matches a skip end ordered set (SKP_END OS); identify a next eight bytes following the SKP_END OS as PHY payload; identify a next eight bytes following the PHY payload as a replicated PHY payload; and determine that a data stream follows the PHY payload that follows the SKP_END OS.

Example 12 may include the subject matter of example 10 10, the port to determine that the second ordered set matches a SKP OS; continue to check bytes following the second ordered set for SKP OS; determine that more than 56 bytes comprise a SKP OS; and cause the link to enter recovery.

Example 13 may include the subject matter of example 10, the port to determine that the second ordered set matches a SKP OS; determine that five of eight bytes following the second ordered set matches a skip end ordered set (SKP_END OS); and identify a next eight bytes following the SKP_END OS as PHY payload; and determine that a data stream follows the PHY payload that follows the SKP_END OS.

Example 14 may include the subject matter of example 13, the port to identify a next eight bytes following the PHY payload as a replicated PHY payload.

Example 15 may include the subject matter of example 1, wherein the first ordered set comprises eight bytes and the second ordered set comprises eight bytes, the first and second ordered sets comprising electrical idle exit ordered sets (EIEOS); the port to receive two additional EIEOS; receive thirty two training sequence ordered sets for link training.

Example 16 may include the subject matter of example 15, wherein each of the training sequence ordered sets comprises a first portion and a second portion, the first portion comprising eight symbols and the second portion comprising eight symbols, each symbol comprising one byte, the first portion comprising identical information in each symbol as the second portion.

Example 17 is a method comprising receiving, at a port, a first bit sequence corresponding to a first ordered set comprising eight bytes; receiving, at the port, a second bit sequence corresponding to a second ordered set comprising eight bytes, the first bit sequence immediately adjacent to the second bit sequence, the first ordered set identical to the second ordered set; comparing a portion of the first ordered set against an expected ordered set; and determining a type of ordered set based on the comparison.

Example 18 may include the subject matter of example 17, wherein receiving the first bit sequence comprises receiving the first bit sequence at a predetermined ordered set interval.

Example 19 may include the subject matter of example 18, wherein the predetermined ordered set interval occurs following a flow control unit (flit).

Example 20 may include the subject matter of examples 17-19, further comprising reading, by the port, the eight bytes of the first ordered set; and checking that five of the eight bytes match an expected type of ordered set.

Example 21 may include the subject matter of example 20, further comprising determining that five of the eight bytes do not match an expected type of ordered set; and entering a link recovery state.

Example 22 may include the subject matter of example 20, the port to determining that five of the eight bytes match an electrical idle ordered set (EIOS); and entering a low power state after the second ordered set.

Example 23 may include the subject matter of example 20, the port to determining that five of the eight bytes match an electrical idle exit ordered set (EIEOS); and entering a link recovery state after the second ordered set.

Example 24 may include the subject matter of example 20, the port to determining that five of the eight bytes match a skip ordered set (SKP OS); reading the second ordered set; and determining an ordered set type from the second ordered set.

Example 25 may include the subject matter of example 24, the port to determining that the second ordered set matches a skip end ordered set (SKP_END OS); identifying a next eight bytes following the SKP_END OS as PHY payload; identifying a next eight bytes following the PHY payload as a replicated PHY payload; and determining that a data stream follows the PHY payload that follows the SKP_END OS.

Example 26 may include the subject matter of example 24, the port to determining that the second ordered set matches a SKP OS; continuing to check bytes following the second ordered set for SKP OS; determining that more than 56 bytes comprise a SKP OS; and causing the link to enter recovery.

Example 27 may include the subject matter of example 24, the port to determining that the second ordered set matches a SKP OS; determining that five of eight bytes following the second ordered set matches a skip end ordered set (SKP_END OS); and identifying a next eight bytes following the SKP_END OS as PHY payload; determining that a data stream follows the PHY payload that follows the SKP_END OS.

Example 28 may include the subject matter of example 17, wherein the first ordered set comprises eight bytes and the second ordered set comprises eight bytes, the first and second ordered sets comprising electrical idle exit ordered sets (EIEOS); the method further comprising receiving two additional EIEOS; receiving thirty two training sequence ordered sets for link training; wherein each of the training sequence ordered sets comprises a first portion and a second portion, the first portion comprising eight symbols and the second portion comprising eight symbols, each symbol comprising one byte, the first portion comprising identical information in each symbol as the second portion.

Example 29 is a system comprising a host device comprising a downstream port; a link partner comprising an upstream port; a link interconnecting the downstream port with the upstream port. The downstream port to transmit, during a predetermined interval, a first set of eight bytes comprising a first ordered set and a second set of eight bytes comprising a second ordered set, the first ordered set identical to the second ordered set. The upstream port to receive the first set of eight bytes; determine that the first set of eight bytes were received during an expected ordered set interval; and identify an ordered set type based on the first set of eight bytes.

Example 30 may include the subject matter of example 29, wherein the first ordered set is received at a predetermined ordered set interval.

Example 31 may include the subject matter of example 30, wherein the predetermined ordered set interval occurs following a flow control unit (flit).

Example 32 may include the subject matter of example 31, wherein the predetermined ordered set interval occurs between two flits.

Example 33 may include the subject matter of any of examples 29-32, the upstream port to determine that five of the eight bytes do not match an expected type of ordered set; and enter a link recovery state.

Example 34 may include the subject matter of any of examples 29-32, the upstream port to determine that five of the eight bytes match an electrical idle ordered set (EIOS); and enter a low power state after the second ordered set.

Example 35 may include the subject matter of any of examples 29-32, the upstream port to determine that five of the eight bytes match an electrical idle exit ordered set (EIEOS); and enter a link recovery state after the second ordered set.

Example 36 may include the subject matter of any of examples 29-32, the upstream port to determine that five of the eight bytes match a skip ordered set (SKP OS); read the second ordered set; and determine an ordered set type from the second ordered set.

Example 37 may include the subject matter of example 36, the upstream port to determine that the second ordered set matches a skip end ordered set (SKP_END OS); identify a next eight bytes following the SKP_END OS as PHY payload; identify a next eight bytes following the PHY payload as a replicated PHY payload; and determine that a data stream follows the PHY payload that follows the SKP_END OS.

Example 38 may include the subject matter of example 36, the upstream port to determine that the second ordered set matches a SKP OS; continue to check bytes following the second ordered set for SKP OS; determine that more than 56 bytes comprise a SKP OS; and cause the link to enter recovery.

Example 39 may include the subject matter of example 29, wherein the first ordered set comprises eight bytes and the second ordered set comprises eight bytes, the first and second ordered sets comprising electrical idle exit ordered sets (EIEOS); the upstream port to receive two additional EIEOS; receive thirty two training sequence ordered sets for link training.

Example 40 may include the subject matter of example 39, wherein each of the training sequence ordered sets comprises a first portion and a second portion, the first portion comprising eight symbols and the second portion comprising eight symbols, each symbol comprising one byte, the first portion comprising identical information in each symbol as the second portion.

What is claimed is:

1. An apparatus comprising:
a receiver comprising a port, the port comprising physical layer circuitry (PHY), the PHY to:
  receive, during a SKIP Ordered Set (SKP OS) interval, an ordered set (OS) from a link;
  wherein the received OS comprises a first eight bytes and a second eight bytes; and
  determine, based on the first eight bytes of the received OS, whether the received OS is a SKP OS, an electrical idle OS (EIOS), or an electrical idle exit OS (EIEOS).

2. The apparatus of claim 1, the PHY to determine the type of OS when at least 5 bytes of the first eight bytes match one type of OS.

3. The apparatus of claim 1, the PHY to determine that the received OS comprises a SKP OS when at least five bytes of the first eight bytes of the received OS correspond to expected bytes for a SKP OS.

4. The apparatus of claim 3, the PHY to:
read a second eight bytes of the received OS;
determine that the second eight bytes of the received OS match a SKP_END OS when at least 5 bytes of the second eight bytes of the received OS match a SKP_END OS; and
process a PHY payload that follows the SKP_END OS.

5. The apparatus of claim 1, the PHY to:
determine that the received OS comprises an EIOS when at least five bytes of the first eight bytes corresponding to bytes for an EIOS; and
cause the link to prepare to enter a low power state.

6. The apparatus of claim 1, the PHY to:
determine that the received OS comprises an EIEOS when at least five bytes of the first eight bytes corresponding to bytes for an EIEOS; and
cause the link to enter recovery.

7. The apparatus of claim 1, the PHY to:
read a second eight bytes of the received OS;
determine that at least five bytes of the second eight bytes do not match any type of OS; and
cause the link to enter recovery.

8. The apparatus of claim 1, wherein the received OS comprises at least 16 bytes.

9. The apparatus of claim 1, wherein SKP OS interval occurs at a flit boundary.

10. The apparatus of claim 1, wherein the SKP OS interval occurs after every 74 flits in SRIS mode.

11. The apparatus of claim 1, wherein the SKP OS interval occurs after about 740 flits in common clock or SRNS mode.

12. The apparatus of claim 1, the PHY to:
receive a PHY payload after receiving the OS; and
determine a payload type from a PHY payload type field, the payload type comprising one of a margin payload or a linear feedback shift register.

13. The apparatus of claim 1, the PHY to determine that the received OS is valid when at least five bytes of the first eight bytes corresponding to an expected value for a type of OS.

14. The apparatus of claim 1, the PHY to:
receive a training sequence ordered set, the training sequence ordered set comprising a first eight bytes and a second eight bytes;
perform a parity check of one of the first eight bytes or the second eight bytes of the training sequence ordered set; and
determine that the training sequence ordered set is valid when the first eight bytes or the second eight bytes passing the parity check.

15. The apparatus of claim 1, the PHY to:
receive a start data stream ordered set;
checking E1_87_87_87 sets in the start data stream ordered set; and
determine that the start data stream ordered set is valid if four E1_87_87_87 sets are valid.

16. A method comprising:
receiving, during a SKIP Ordered Set (SKP OS) interval, an ordered set (OS) from across a link;
reading a first eight bytes of the received OS; and
determining, based on the first eight bytes of the received OS, whether the received OS is a SKP OS, an electrical idle OS (EIOS), or an electrical idle exit OS (EIEOS).

17. The method of claim 16, further comprising determining the type of OS when at least 5 bytes of the first eight bytes match one type of OS.

18. The method of claim 16, further comprising determining that the receive OS comprises a SKP OS when at least five bytes of the first eight bytes of the received OS correspond to expected bytes for a SKP OS.

19. The method of claim 18, further comprising:
reading a second eight bytes of the received OS;
determining that the second eight bytes of the received OS match a SKP_END OS when at least 5 bytes of the second eight bytes of the received OS matching a SKP_END OS; and
processing a PHY payload that follows the SKP_END OS.

20. The method of claim 16, further comprising:
determining that the received OS comprises an EIOS when at least five bytes of the first eight bytes corresponding to bytes for an EIOS; and
cause the link to prepare to enter a low power state.

21. The method of claim 16, further comprising:
determining that the received OS comprises an EIEOS when at least five bytes of the first eight bytes corresponding to bytes for an EIEOS; and
causing the link to enter recovery.

22. The method of claim 16, further comprising:
reading a second eight bytes of the received OS;
determining that at least five bytes of the second eight bytes do not match any type of OS; and
causing the link to enter recovery.

23. The method of claim 16, wherein the received OS comprises at least 16 bytes.

24. The method of claim 16, wherein SKP OS interval occurs at a flit boundary.

25. The method of claim 16, wherein the SKP OS interval occurs after every 74 flits in SRIS mode.

26. The method of claim 16, wherein the SKP OS interval occurs after about 740 flits in common clock or SRNS mode.

27. The method of claim 16, further comprising:
receiving a PHY payload after receiving the OS; and
determining a payload type from a PHY payload type field, the payload type comprising one of a margin payload or a linear feedback shift register.

28. The method of claim 16, further comprising determining that the received OS is valid when at least five bytes of the first eight bytes corresponding to an expected value for a type of OS.

29. The method of claim 16, further comprising:
receiving a training sequence ordered set, the training sequence ordered set comprising a first eight bytes and a second eight bytes;
performing a parity check of one of the first eight bytes or the second eight bytes of the training sequence ordered set; and
determining that the training sequence ordered set is valid when the first eight bytes or the second eight bytes passing the parity check.

30. The method of claim 16, further comprising:
receiving a start data stream ordered set;
checking E1_87_87_87 sets in the start data stream ordered set; and
determining that the start data stream ordered set is valid if four E1_87_87_87 sets are valid.

31. A system comprising:
a first device;
a second device;
the second device coupled to the first device by a link, wherein the link comprises multiple physical lanes;
the first device comprising protocol stack circuitry to send an ordered set comprising a first eight bytes and a second eight bytes to the second device;
the second device comprising protocol stack circuitry to:
receive, during a SKIP Ordered Set (SKP OS) interval, an ordered set (OS) from across a link;
read a first eight bytes of the received OS; and
determine, based on the first eight bytes of the received OS, whether the received OS is a SKP OS, an electrical idle OS (EIOS), or an electrical idle exit OS (EIEOS).

32. The system of claim 31, the second device to determine the type of OS when at least 5 bytes of the first eight bytes match one type of OS.

33. The system of claim 31, the second device to determine that the received OS comprises a SKP OS when at least five bytes of the first eight bytes of the received OS correspond to expected bytes for a SKP OS.

34. The system of claim 33, the second device to:
read a second eight bytes of the received OS;
determine that the second eight bytes of the received OS match a SKP_END OS when at least 5 bytes of the second eight bytes of the received OS matching a SKP_END OS; and
process a PHY payload that follows the SKP_END OS.

* * * * *